US012333210B2

(12) United States Patent
Kim et al.

(10) Patent No.: US 12,333,210 B2
(45) Date of Patent: Jun. 17, 2025

(54) ELECTRONIC DEVICE INCLUDING FLEXIBLE DISPLAY AND METHOD FOR OPERATING THE SAME

(71) Applicant: SAMSUNG ELECTRONICS CO., LTD., Suwon-si (KR)

(72) Inventors: Wankyu Kim, Suwon-si (KR);
Jooyoung Kang, Suwon-si (KR);
Dahee Kim, Suwon-si (KR);
Byungwoo Min, Suwon-si (KR);
Sangeun Lee, Suwon-si (KR);
Moonjeong Kim, Suwon-si (KR);
Sunghwan Park, Suwon-si (KR);
Jookwan Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 257 days.

(21) Appl. No.: 18/092,524

(22) Filed: Jan. 3, 2023

(65) Prior Publication Data

US 2023/0214174 A1 Jul. 6, 2023

Related U.S. Application Data

(63) Continuation of application No. PCT/KR2022/020469, filed on Dec. 15, 2022.

(30) Foreign Application Priority Data

Jan. 3, 2022 (KR) .................. 10-2022-0000131
Feb. 18, 2022 (KR) .................. 10-2022-0021635

(51) Int. Cl.
*G06F 3/16* (2006.01)
*H04M 1/02* (2006.01)

(52) U.S. Cl.
CPC .......... *G06F 3/165* (2013.01); *H04M 1/0235* (2013.01); *H04M 1/0268* (2013.01); *H04M 2201/38* (2013.01)

(58) Field of Classification Search
CPC .... G06F 3/165; G06F 1/1652; H04M 1/0268; H04M 1/0235; H04M 1/0241
See application file for complete search history.

(56) References Cited

U.S. PATENT DOCUMENTS 8,174,628 B2   5/2012  Matsushita et al.
10,769,755 B1 * 9/2020  Kline .................. H04N 9/3179
(Continued)

FOREIGN PATENT DOCUMENTS

CN   113114832   7/2021
CN   113315859   8/2021
(Continued)

OTHER PUBLICATIONS

International Search Report dated Mar. 13, 2023 in PCT Application No. PCT/KR 2022/020469.
(Continued)

Primary Examiner — Xuemei Zheng
(74) Attorney, Agent, or Firm — Nixon & Vanderhye, P.C.

(57) ABSTRACT

An example electronic device may include a housing, a flexible display, wherein at least a portion of the flexible display which is positioned in the housing is configured to be exposed to an outside of the housing as the housing slides, a speaker, and a processor operatively connected with the speaker and the flexible display. The processor may be configured to control the speaker to output a first sound at a first volume value while a state of the housing is a normal state, identify a size of a first area of the flexible display exposed to the outside, based on a first slide of the housing (Continued)

to change the state of the housing to an extended state, and control the speaker to output the first sound at a second volume value higher than the first volume value based on a size of the first area while the state of the housing is the extended state.

18 Claims, 19 Drawing Sheets

(56) References Cited

U.S. PATENT DOCUMENTS

| | | |
|---|---|---|
| 10,887,683 B1 | 1/2021 | Choi et al. |
| 11,036,258 B2 | 6/2021 | Choi et al. |
| 11,150,742 B2 | 10/2021 | Kwon et al. |
| 12,088,744 B2* | 9/2024 | Lee ..................... H04M 1/0237 |
| 2005/0099544 A1* | 5/2005 | Kojima ................ H04N 21/426 |
| | | 348/E5.111 |
| 2017/0192740 A1* | 7/2017 | Armstrong ............. G06F 3/165 |
| 2018/0035208 A1* | 2/2018 | Choi ...................... H04R 1/028 |
| 2019/0146557 A1* | 5/2019 | Choi ................... G06F 3/04847 |
| | | 361/749 |
| 2019/0261519 A1 | 8/2019 | Park et al. |
| 2022/0206741 A1* | 6/2022 | Xu ........................ G06F 1/1652 |
| 2023/0262156 A1 | 8/2023 | Guo |

FOREIGN PATENT DOCUMENTS

| | | |
|---|---|---|
| CN | 112492070 | 4/2023 |
| JP | 4777316 | 9/2011 |
| KR | 10-2014-0012463 | 2/2014 |
| KR | 10-2017-0048007 | 5/2017 |
| KR | 10-2019-0101184 | 8/2019 |
| WO | 2021/080041 | 4/2021 |

OTHER PUBLICATIONS

Written Opinion dated Mar. 13, 2023 in PCT Application No. PCT/KR 2022/020469.

* cited by examiner

ELECTRONIC DEVICE INCLUDING FLEXIBLE DISPLAY AND METHOD FOR OPERATING THE SAME

CROSS-REFERENCE TO RELATED APPLICATIONS

This application is a continuation of International Application No. PCT/KR2022/020469 designating the United States, filed on Dec. 15, 2022, in the Korean Intellectual Property Receiving Office and claiming priority to Korean Patent Application No. 10-2022-0000131, filed on Jan. 3, 2022, and to Korean Patent Application No. 10-2022-0021635, filed on Feb. 18, 2022, in the Korean Intellectual Property Office, the disclosures of each of which are incorporated by reference herein in their entireties.

BACKGROUND

Technical Field

The disclosure relates to electronic devices, e.g., an electronic device including a flexible display and a method for operating the same.

Description of Related Art

As the demand for mobile communication increases, and as the degree of integration of electronic devices increases, the portability of electronic devices such as mobile communication terminals may be increased, and better convenience may be provided in use of multimedia functions. For example, as touchscreen-integrated displays replace traditional mechanical (button-type) keypads, electronic devices may become more compact while functioning as an input device. For example, because the mechanical keypad may be omitted from the electronic device, portability of the electronic device may be improved. Because the display area may be expanded to the area which used to be occupied by the mechanical keypad, the electronic device may provide a larger screen while generally retaining the same size and weight as when a device including the mechanical keypad.

Use of an electronic device with a larger screen may give more convenience in, e.g., web browsing or multimedia playing. A larger display may be adopted to output a larger screen. However, the size of the display is limited by the portability of the electronic device. According to an embodiment, flexible displays may allow better portability for electronic devices while providing a larger screen. For example, a display using (or equipped with) a flexible display may implement a stable operation even if it is made quite thin, so that the display may be applied to an electronic device in a foldable, bendable or rollable form.

SUMMARY

Embodiments of the disclosure provide an electronic device and an operation method thereof for controlling a volume value output through a speaker and/or a graphic user interface related to the volume value according to the extension or contraction of a flexible display of the electronic device.

According to various example embodiments, an electronic device may include a housing, a flexible display, wherein at least a portion of the flexible display which is positioned in the housing is configured to be exposed to an outside of the housing by sliding, a speaker, and a processor operatively connected with the speaker and the flexible display. The processor may be configured to control the speaker to output a first sound at a first volume value while a state of the housing is a normal state, identify a size of a first area of the flexible display exposed to the outside, based on a first sliding of the housing to change the state of the housing to an extended state, and control the speaker to output the first sound at a second volume value higher than the first volume value based on a size of the first area, while the state of the housing is the extended state.

According to various example embodiments, a method for operating an electronic device including a flexible display may include controlling a speaker of the electronic device to output a first sound at a first volume value while a state of the housing is a normal state, identifying a size of a first area of the flexible display exposed to the outside, based on a first sliding of the housing to change the state of the housing to an extended state, and controlling the speaker to output the first sound at a second volume value higher than the first volume value based on a size of the first area while the state of the housing is the extended state.

According to various example embodiments, an electronic device may include a housing, a flexible display exposed to an outside of the housing as the housing slides with at least a portion thereof positioned in the housing, a speaker, and a processor operatively connected with the speaker and the flexible display. The processor may be configured to: control the speaker to output a first sound at a first volume value while controlling the flexible display to display a first object of a first size indicating an output state of the first sound while a state of the housing is a normal state, identify a size of a first area of the flexible display exposed to the outside, based on a first sliding of the housing to change the state of the housing from the normal state to an extended state, and control the speaker to output the first sound at a second volume value higher than the first volume value while controlling the flexible display to display the first object extended from the first size to a second size based on the size of the first area while the state of the housing is the extended state.

According to various example embodiments of the disclosure, an electronic device can be provided that enhances user convenience in volume control by controlling a volume value output through a speaker and/or a graphic user interface related to the volume value according to the extension or contraction of a housing of the electronic device and a method for operating the same.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1A:
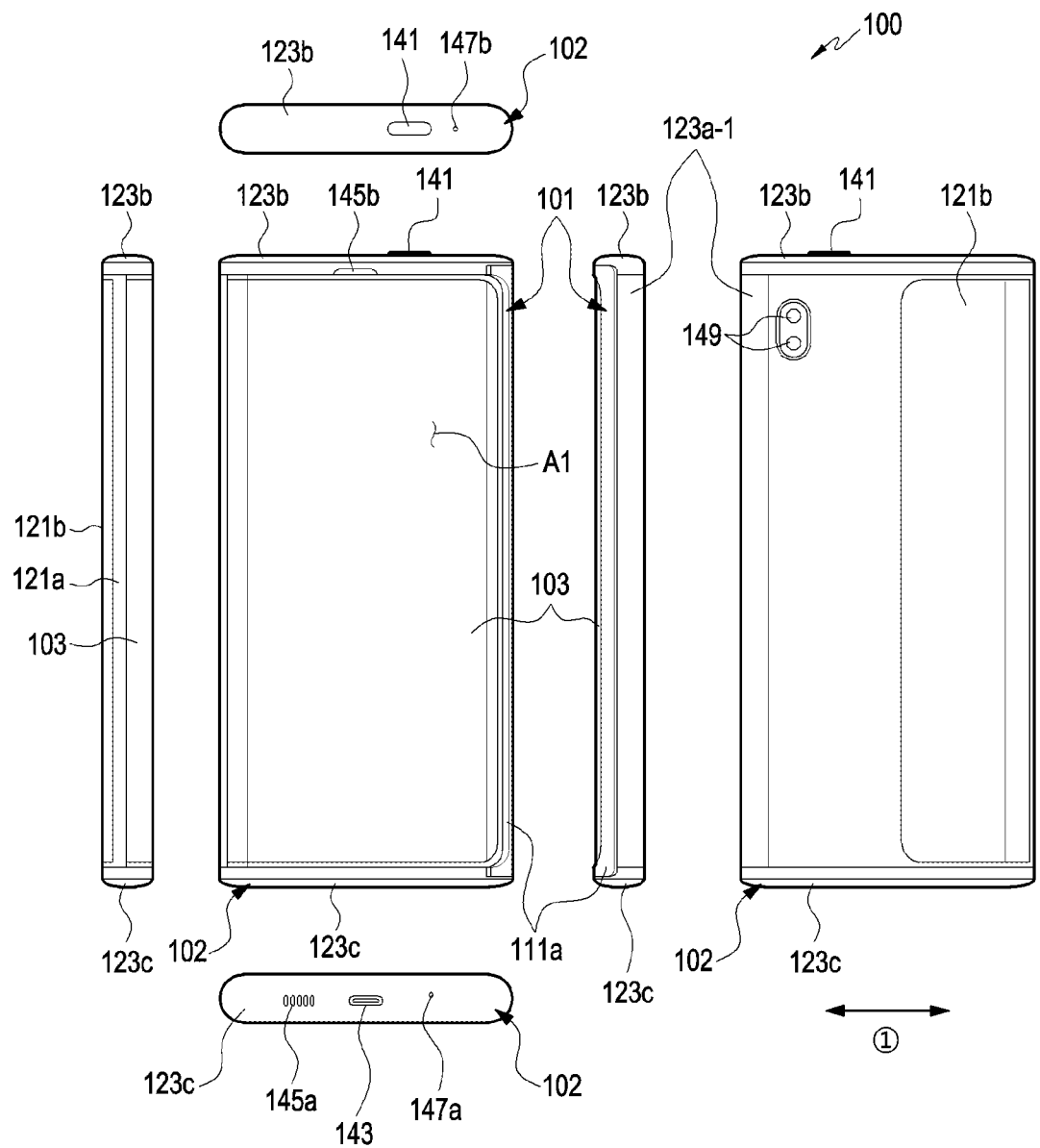
FIG. 1A is a view illustrating an example electronic device according to various embodiments, wherein a portion of a flexible display is received in a second structure.

FIG. 1A is a view illustrating an example electronic device 100 according to various embodiments, wherein a portion (e.g., a portion of a second area A2) of a flexible display 103 is received in a second structure 102.

Figure 1B:
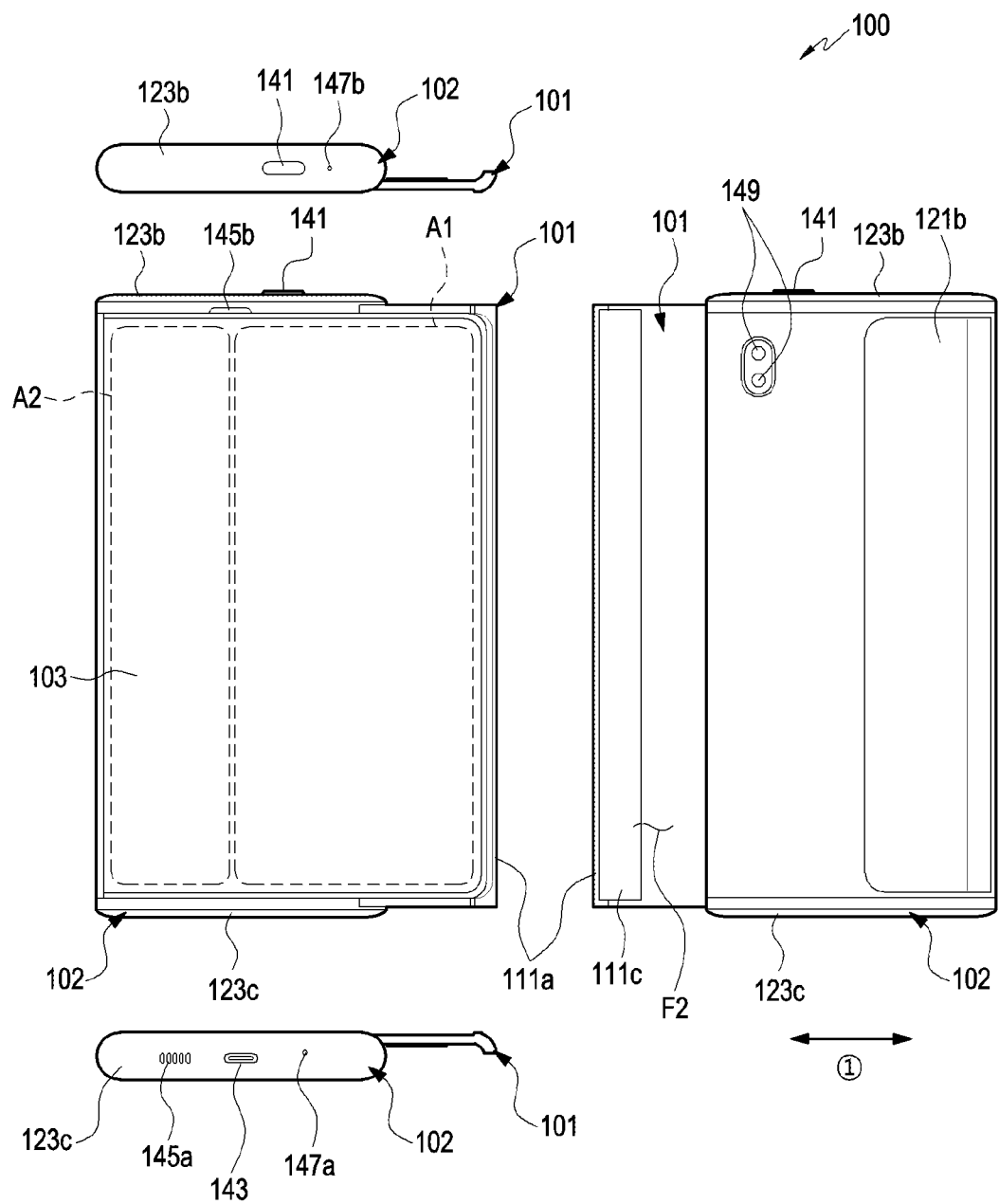
FIG. 1B is a view illustrating an example electronic device according to various embodiments, wherein most of a flexible display is exposed to the outside of a second structure.

FIG. 1B is a view illustrating the example electronic device 100 according to various embodiments, wherein most of a flexible display 103 is exposed to the outside of a second structure 102.

The state shown in FIG. 1A may be defined as a first structure 101 being closed with respect to a second structure 102, and the state shown in FIG. 1B may be defined as the first structure 101 being opened with respect to the second structure 102. The electronic device described herein is not limited to a specific structure, and may include any electronic device having a shape or structure for changing a size of an exposed area of a flexible display. Therefore, according to various embodiments, "closed state" may, for example, refer to a closed state, a slide-in state, a roll-in state, or a folded state of the electronic device, and "opened state" may, for example, refer to an opened state, a slide-out state, a roll-out state, or an unfolded state of the electronic device.

Referring to FIGS. 1A and 1B, an electronic device 100 may include a first structure 101 and a second structure 102, the second structure 102 is disposed to be movable in the first structure 101. According to an embodiment, the electronic device 100 may, for example, have a structure in which the first structure 101 is slidably disposed on the second structure 102. According to an embodiment, the first structure 101 may be disposed to perform reciprocating motion by a predetermined distance in a predetermined direction with respect to the second structure 102, for example, a direction indicated by an arrow ①.

According to an embodiment, the first structure 101 may be referred to as, for example, a first housing, a slide unit, or a slide housing, and may be disposed to reciprocate on the second structure 102. According to an embodiment, the second structure 102 may be referred to as, for example, a second housing, a main part, or a main housing, and may receive various electric or electronic components such as a main circuit board or a battery. A portion (e.g., the first area A1) of the display 103 may be seated on the first structure 101. According to an embodiment, another portion (e.g., the second area A2) of the display 103 may be received (e.g., slide-in) into the inside of the second structure 102 or exposed (e.g., slide-out) to the outside of the second structure 102 as the first structure 101 moves (e.g., slides) relative to the second structure 102.

According to various embodiments, the first structure 101 may include a first plate 111a (e.g., a slide plate) and may include a first surface F1 (refer to FIG. 1C) formed with at least a portion of the first plate 111a and a second surface F2 facing in a direction opposite to the first surface F1. According to an embodiment, the second structure 102 may include a second plate 121a (refer to FIG. 1C) (e.g., a rear case), a first sidewall 123a extending from the second plate 121a, a second sidewall 123b extending from the first sidewall 123a and the second plate 121a, a third sidewall 123c extending from the first sidewall 123a and the second plate 121a and positioned parallel to the second sidewall 123b, and/or a rear plate 121b (e.g., a rear window). According to an embodiment, the second sidewall 123b and the third sidewall 123c may be formed to be perpendicular to the first sidewall 123a. According to an embodiment, the second plate 121a, the first sidewall 123a, the second sidewall 123b, and the third sidewall 123c may be formed to have an opening (e.g., in the front face) to receive (or surround) at least a portion of the first structure 101. For example, the first structure 101 may be coupled to the second structure 102 in a state in which it is at least partially surrounded, and the first structure 101 may slide in a direction parallel to the first surface F1 or the second surface F2, for example, direction ① indicated with the arrow.

According to an embodiment, the second sidewall 123b or the third sidewall 123c may be omitted. According to an embodiment, the second plate 121a, the first sidewall 123a, the second sidewall 123b, and/or the third sidewall 123c may be formed as separate structures and may be combined or assembled. The rear plate 121b may be coupled to surround at least a portion of the second plate 121*a*. In various embodiments, the rear plate 121*b* may be formed substantially integrally with the second plate 121*a*. According to an embodiment, the second plate 121*a* or the rear plate 121*b* may cover at least a portion of the flexible display 103. For example, the flexible display 103 may be at least partially received inside the second structure 102, and the second plate 121*a* or the rear plate 121*b* may cover the portion of the flexible display received inside the second structure 102.

According to an embodiment, the first structure 101 may be moved in an opened state or closed state with respect to the second structure 102 in a first direction (e.g., direction ①) parallel with the second plate 121*a* (e.g., the rear case) and the second side wall 123*b* to be positioned a first distance away from the first side wall 123*a* in the closed state and be positioned a second distance away from the first side wall 123*a* in the opened state, wherein the second distance is larger than the first distance. In various embodiments, when in the closed state, the first structure 101 may be positioned to surround a portion of the first sidewall 123*a*.

According to various embodiments, the electronic device 100 may include a display 103, a key input device 141, a connector hole 143, audio modules 145*a*, 145*b*, 147*a*, or 147*b*, or a camera module 149. Although not shown, the electronic device 100 may further include an indicator (e.g., a light emitting diode (LED) device) or various sensor modules.

According to an embodiment, the display 103 may include a first area A1 and a second area A2. In an embodiment, the first area A1 may extend substantially across at least a portion of the first surface F1 and may be disposed on the first surface F1. The second area A2 may extend from the first area A1 and be inserted or slid into the inside of the second structure 102 (e.g., housing) or be slid or exposed to the outside of the structure 102 as the first structure 101 slides. As will be described below, the second area A2 may be moved while being substantially guided by a roller 151 (refer to FIG. 1C) mounted on the second structure 102 and may thus be slid into the inside of or exposed to the outside of the second structure 102. For example, while the first structure 101 slides, a portion of the second area A2 may be deformed into a curved shape in a position corresponding to the roller 151. The roller 151 is rotatable or fixed, and may have at least a partial curved surface to guide the movement of the second area A2.

According to various embodiments, when viewed from the top of the first plate 111*a* (e.g., slide plate), when the first structure 101 moves from the closed state to the opened state, the second area A2 may be gradually exposed to the outside of the second structure 102 to be substantially coplanar with the first area A1. The display 103 may be disposed to be coupled with, or adjacent, a touch detecting circuit, a pressure sensor capable of measuring the strength (pressure) of touches, and/or a digitizer for detecting a magnetic field-type stylus pen. In an embodiment, the second area A2 may be at least partially received inside the second structure 102, and a portion of the second area A2 may be exposed to the outside even in the state shown in FIG. 1A (e.g., the closed state). In various embodiments, irrespective of the closed state or the opened state, the exposed portion of the second area A2 may be positioned on the roller 151 and, in a position corresponding to the roller 151, a portion of the second area A2 may maintain the curved shape.

The key input device 141 may be disposed on the second sidewall 123*b* or the third sidewall 123*c* of the second structure 102. Depending on the appearance and the state of use, the electronic device 100 may be designed to omit the illustrated key input device 141 or to include additional key input device(s). According to an embodiment, the electronic device 100 may include a key input device (not shown), e.g., a home key button or a touchpad disposed around the home key button. According to an embodiment, at least a portion of the key input device 141 may be positioned on an area of the first structure 101.

According to various embodiments, the connector hole 143 may be omitted or may receive a connector (e.g., a universal serial bus (USB) connector) for transmitting and receiving power and/or data with an external electronic device. Although not shown, the electronic device 100 may include a plurality of connector holes 143, and some of the plurality of connector holes 143 may function as connector holes for transmitting/receiving audio signals with an external electronic device. In the illustrated example embodiment, the connector hole 143 is disposed on the third side wall 123*c*, but the disclosure is not limited in this respect. For example, the connector hole 143 or a connector hole not shown may be disposed on the first side wall 123*a* or the second sidewall 123*b*.

According to various embodiments, the audio modules 145*a*, 145*b*, 147*a*, and 147*b* may include speaker holes 145*a* and 145*b* or microphone holes 147*a* and 147*b*. One of the speaker holes 145*a* and 145*b* may be provided as a receiver hole for voice calls, and the other may be provided as an external speaker hole. The microphone holes 147*a* and 147*b* may have a microphone inside to obtain external sounds. According to an embodiment, there may be a plurality of microphones to be able to detect the direction of a sound. In various embodiments, the speaker holes 145*a* and 145*b* and the microphone holes 147*a* and 147*b* may be implemented as one hole, or a speaker may be included without the speaker holes 145*a* and 145*b* (e.g., a piezo speaker). According to an embodiment, the speaker hole indicated by the reference number "145*b*" may be disposed in the first structure 101 and used as a receiver hole for voice calls, and the speaker hole indicated by the reference number "145*a*" (e.g., an external speaker hole) or the microphone holes 147*a* and 147*b* may be disposed in the second structure 102 (e.g., one of the side surfaces 123*a*, 123*b*, and 123*c*).

The camera module 149 may be provided on the second structure 102 and may capture a subject in a direction opposite to the first area A1 of the display 103. The electronic device 100 may include a plurality of camera modules 149. For example, the electronic device 100 may include a wide-angle camera, a telephoto camera, or a close-up camera, and, according to an embodiment, by including an infrared projector and/or an infrared receiver, the electronic device 100 may measure the distance to the subject. The camera module 149 may include one or more lenses, an image sensor, and/or an image signal processor. Although not shown, the electronic device 100 may further include a camera module (e.g., a front camera) that captures the subject in a same direction as the first area A1 of the display 103. For example, the front camera may be disposed around the first area A1 or in an area overlapping the display 103 and, when disposed in the area overlapping the display 103, the front camera may capture the subject via the display 103.

According to various embodiments, an indicator (not shown) of the electronic device 100 may be disposed on the first structure 101 or the second structure 102, and the indicator may include a light emitting diode to provide state information about the electronic device 100 as a visual signal. The sensor module (not shown) of the electronic device 100 may produce an electrical signal or data value corresponding to the internal operation state or external environment state of the electronic device.

Figure 1C:
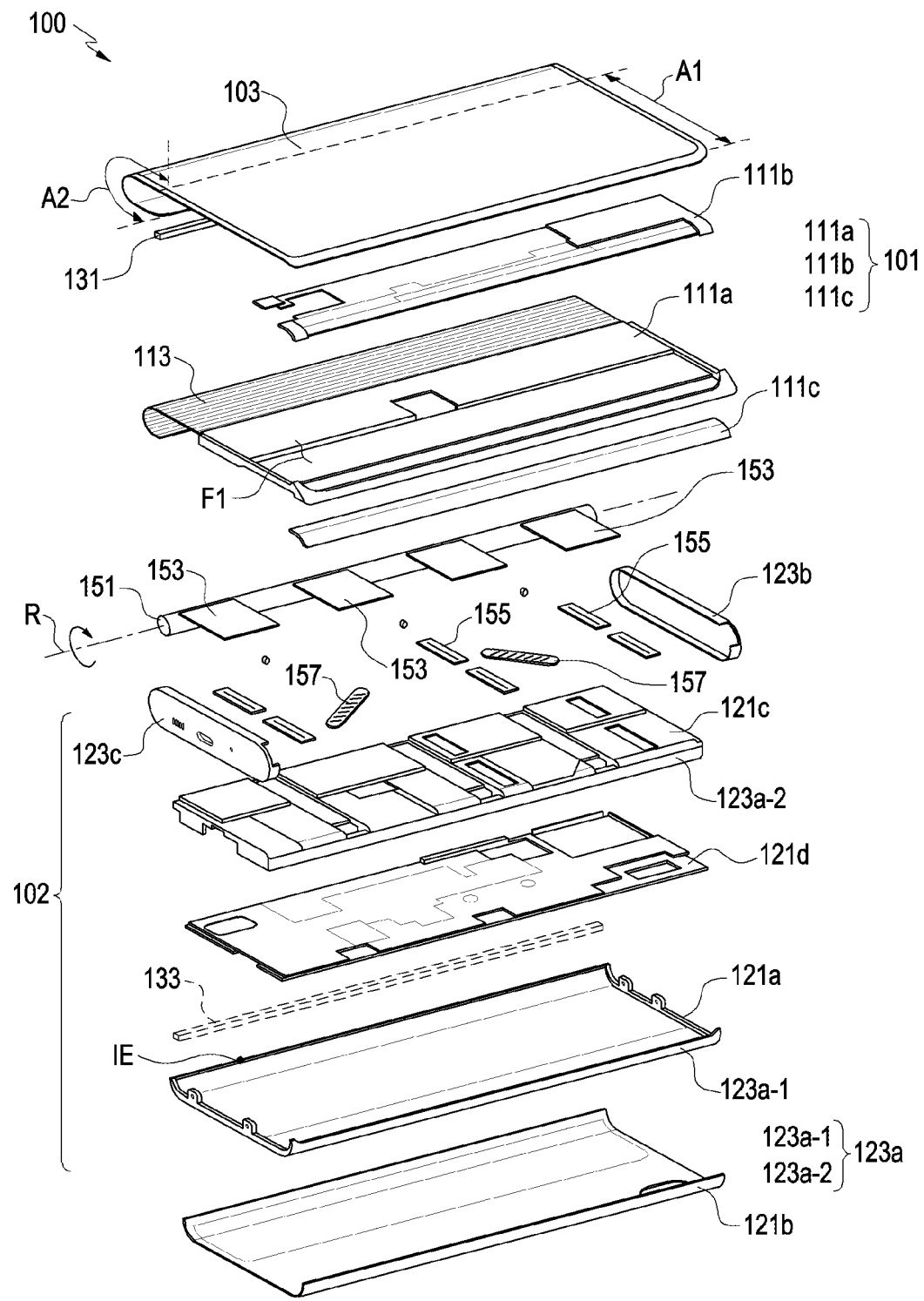
FIG. 1C is an exploded perspective view illustrating an example electronic device according to various embodiments.

FIG. 1C is an exploded perspective view illustrating an example electronic device (e.g., the electronic device 100 of FIG. 1A or 1B) according to various embodiments.

Referring to FIG. 1C, the electronic device 100 may include a first structure 101, a second structure 102 (e.g., a housing), a display 103 (e.g., a flexible display), a guide member (e.g., the roller 151), a support sheet 153, and/or a multi-joint hinge structure 113. A portion (e.g., the second area A2) of the display 103 may be accommodated in the second structure 102 while being guided (supported) by the roller 151.

According to various embodiments, the first structure 101 may include a first plate 111a (e.g., a slide plate), a first bracket 111b and/or a second bracket 111c mounted on the first plate 111a. The first structure 101, for example, the first plate 111a, the first bracket 111b, and/or the second bracket 111c may be formed of a metallic material and/or a non-metallic (e.g., polymer) material. The first plate 111a may be mounted on the second structure 102 (e.g., the housing) and may be linearly reciprocated in one direction (e.g., in the direction ① indicated with the arrow in FIG. 1A) while being guided (supported) by the second structure 102. In an embodiment, the first bracket 111b may be coupled to the first plate 111a to, together with the first plate 111a, form the first surface F1 of the first structure 101. The first area A1 of the display 103 may be substantially mounted on the first surface F1 and remain in a flat plate shape. The second bracket 111c may be coupled to the first plate 111a to, together with the first plate 111a, form the second surface F2 of the first structure 101. According to an embodiment, the first bracket 111b and/or the second bracket 111c may be integrally formed with the first plate 111a. This may be appropriately designed in consideration of the assembly structure or manufacturing process of the product to be manufactured. The first structure 101 or the first plate 111a may be coupled with the second structure 102 and slide with respect to the second structure 102.

According to various embodiments, the multi-joint hinge structure 113 may include a plurality of bars or rods and may be connected to one end of the first structure 101. For example, as the first structure 101 slides, the multi-joint hinge structure 113 may move with respect to the second structure 102 and, in a closed state (e.g., the state shown in FIG. 1A), the multi-joint hinge structure 113 may be substantially accommodated inside the second structure 102. In some embodiments, even in the closed state, a portion of the multi-joint hinge structure 113 may not be accommodated inside the second structure 102. For example, even in the closed state, a portion of the multi-joint hinge structure 113 may be positioned to correspond to the roller 151 outside the second structure 102.

According to various embodiments, the second structure 102 (e.g., the housing) may include a second plate 121a (e.g., the rear case), a printed circuit board (not shown), a rear plate 121b, a third plate 121c (e.g., the front case), and a supporting member 121d. The second plate 121a, e.g., the rear case, may be disposed to face in a direction opposite to the first surface F1 of the first plate 111a, and the second plate 121a may substantially form the external shape of the second structure 102 or the electronic device 100. In an embodiment, the second structure 102 may include a first sidewall 123a extending from the second plate 121a, a second sidewall 123b extending from the second plate 121a and formed to be substantially perpendicular to the first sidewall 123a, and a third sidewall 123c extending from the second plate 121a, substantially perpendicular to the first sidewall 123a, and parallel to the second sidewall 123b. In the illustrated example embodiment, the second sidewall 123b and the third sidewall 123c are manufactured as separate components from the second plate 121a and are mounted or assembled on the second plate 121a. However, the second sidewall 123b and the third sidewall 123c may alternatively be integrally formed with the second plate 121a. The second structure 102 may receive an antenna for proximity wireless communication, an antenna for wireless charging, and/or an antenna for magnetic secure transmission (MST) in a space that does not overlap the multi-joint hinge structure 113.

According to various embodiments, the rear plate 121b may be coupled to the outer surface of the second plate 121a and, according to an embodiment, the rear plate 121b may be manufactured integrally with the second plate 121a. In an embodiment, the second plate 121a may be formed of a metal or polymer, and the rear plate 121b may be formed of a material such as metal, glass, synthetic resin, or ceramic to decorate the exterior of the electronic device 100. According to an embodiment, the second plate 121a and/or the rear plate 121b may be formed of a material that transmits light at least partially (e.g., an auxiliary display area). For example, while a portion (e.g., the second area A2) of the display 103 is accommodated in the second structure 102, the electronic device 100 may output visual information using a partial area of the display 103 received inside the second structure 102. The auxiliary display area may provide the visual information output from the area received inside the second structure 102 to the outside of the second structure 102.

According to various embodiments, the third plate 121c may be formed of a metal or polymer, and the third plate 121c may be coupled with the second plate 121a (e.g., rear case), the first sidewall 123a, the second sidewall 123b, and/or the third sidewall 123c to form an internal space of the second structure 102. According to an embodiment, the third plate 121c may be referred to as a "front case", and the first structure 101, e.g., the first plate 111a, may be slid while substantially facing the third plate 121c. In various embodiments, the first sidewall 123a may be formed of a combination of a first sidewall portion 123a-1 extending from the second plate 121a and a second sidewall portion 123a-2 formed at an edge of the third plate 121c. According to an embodiment, the first sidewall portion 123a-1 may be coupled to surround an edge of the third plate 121c, e.g., the second sidewall portion 123a-2. In this case, the first sidewall portion 123a-1 itself may form the first sidewall 123a.

According to various embodiments, the support member 121d may be disposed in a space between the second plate 121a and the third plate 121c, and may have a flat plate shape formed of a metal or polymer. The support member 121d may provide an electromagnetic shielding structure in the internal space of the second structure 102 or may increase mechanical rigidity of the second structure 102. In an embodiment, when received into the inside of the second structure 102, a partial area (e.g., the second area A2) of the multi-joint hinge structure 113 and/or the display 103 may be positioned in a space between the second plate 121a and the support member 121d.

According to various embodiments, a printed circuit board (not shown) may be disposed in a space between the third plate 121c and the support member 121d. For example, the printed circuit board may be accommodated in a space separated by the support member 121d from the space in which a partial area of the multi-joint hinge structure 113 and/or the display 103 is accommodated inside the second structure 102. A processor, memory, and/or interface may be mounted on the printed circuit board. The processor may include one or more of, e.g., a central processing unit, an application processor, a graphic processing device, an image signal processing, a sensor hub processor, or a communication processor.

The memory may include, e.g., a volatile or non-volatile memory.

The interface may include, e.g., a high definition multimedia interface (HDMI), a universal serial bus (USB) interface, a secure digital (SD) card interface, and/or an audio interface. The interface may electrically or physically connect, e.g., the electronic device 100 with an external electronic device and may include a USB connector, an SD card/multimedia card (MMC) connector, or an audio connector.

According to various embodiments, the display 103 may at least partially be a flexible display, and the display 103 may normally remain in the flat shape and may be at least partially deformed into a curved shape. In an embodiment, the first area A1 of the display 103 may be mounted or attached to the first surface F1 of the first structure 101 and maintained in a substantially flat shape. The second area A2 may extend from the first area A1 and may be supported or attached to the multi-joint hinge structure 113. For example, the second area A2 may extend along the sliding direction of the first structure 101 and, along with the multi-joint hinge structure, may be accommodated in the second structure 102. As the multi-joint hinge structure 113 is deformed, the second area A2 may be at least partially deformed into a curved shape.

According to various embodiments, as the first structure 101 slides on the second structure 102, the area of the display 103 exposed to the outside may vary. The electronic device 100 (e.g., processor) may change the area of the display 103 that is activated based on the area of the display 103 that is exposed to the outside. For example, in the opened state or in an intermediate position between the closed state and the opened state, the electronic device 100 may activate a partial area exposed to the outside of the second structure 102 of the entire area of the display 103. In the closed state, the electronic device 100 may activate the first area A1 of the display 103 and deactivate the second area A2. In the closed state, when there is no user input for a certain period of time (e.g., 30 seconds or 2 minutes), the electronic device 100 may deactivate the entire area of the display 103. In various embodiments, in the state in which the entire area of the display 103 is deactivated, the electronic device 100 may activate a partial area of the display 103 as necessary (e.g., a notification according to user settings, missing call/received message notification) and provide visual information through the auxiliary display area (e.g., a portion of the second plate 121a and/or the rear plate 121b formed of a material that transmits light).

According to various embodiments, in the opened state (e.g., the state shown in FIG. 1B), the entire area (e.g., the first area A1 and the second area A2) of the display 103 may be substantially exposed to the outside, and the first area A1 and the second area A2 may be arranged to form a plane. In an embodiment, even in the opened state, a portion (e.g., one end) of the second area A2 may be positioned corresponding to the roller 151, and the portion of the second area A2, which corresponds to the roller 151 may remain in the curved shape. For example, according to an embodiment, despite the phrase "the second area A2 is disposed to form a plane in the opened state," a portion of the second area A2 may remain in the curved shape. Likewise, although it is stated that "in the closed state, the multi-joint hinge structure 113 and/or the second area A2 are received inside the second structure 102," a portion of the second area A2 of the multi-joint hinge structure 113 may be positioned outside the second structure 102.

According to an embodiment, the guide member, e.g., the roller 151, may be mounted in a position adjacent to an edge of the second structure 102 (e.g., the second plate 121a). For example, the roller 151 may be disposed adjacent to an edge (e.g., the portion indicated with reference denotation 'IE') of the second plate 121a parallel to the first side wall 123a. Although no reference denotation is assigned in the drawings, another sidewall may extend from the edge of the second plate 121a, and the sidewall adjacent to the roller 151 may be substantially parallel to the first sidewall 123a. As mentioned above, the sidewall of the second structure 102 adjacent to the roller 151 may be formed of or include a material that transmits light, and a portion of the second area A2 may provide visual information via the portion of the second structure 102 while being received in the second structure 102.

According to various embodiments, an end of the roller 151 may be rotatably coupled to the second sidewall 123b, and the other end thereof may be rotatably coupled to the third sidewall 123c. For example, the roller 151 may be mounted on the second structure 102, rotating about the rotation axis R perpendicular to the sliding direction (e.g., direction ① indicated with the arrow in FIG. 1A or 1B) of the first structure 101. The rotation axis R may be disposed substantially parallel to the first side wall 123a, and may be positioned away from the first side wall 123a, for example, at one edge of the second plate 121a. In an embodiment, the gap formed between the outer circumferential surface of the roller 151 and the inner surface of the edge of the second plate 121a may form an entrance through which the multi-joint hinge structure 113 or display 103 enters the second structure 102. The roller 151 may be disposed in the form of a non-rotating, fixed roller bar as described above.

According to various embodiments, when the display 103 is deformed into a curved shape, the roller 151 maintains a radius of curvature of the display 103 to a certain degree, thereby suppressing excessive deformation of the display 103. The term "excessive deformation" may, for example, refer to the display 103 being deformed to have a radius of curvature that is too small and causes damage to pixels or signal lines included in the display 103. For example, the display 103 may be moved or deformed while being guided by the roller 151 and may be protected from damage due to excessive deformation. In various embodiments, the roller 151 may rotate while the multi-joint hinge structure 113 or the display 103 is inserted into or extracted from the second structure 102. For example, the friction between the multi-joint hinge structure 113 (or display 103) and the second structure 102 may be suppressed, allowing the multi-joint hinge structure 113 (or display 103) to smooth the insertion/extraction of the second structure 102.

According to various embodiments, the support sheet 153 may be formed of a material having flexibility and a certain degree of elasticity, for example, a material including an elastic body such as silicone or rubber. As the roller 151 rotates, with the support sheet 153 mounted or attached to the roller 151, the support sheet 153 may be selectively wound around the roller 151. In the illustrated embodiment, a plurality of (e.g., four) support sheets 153 may be arranged along the direction of the rotation axis R of the roller 151.

For example, the plurality of support sheets 153 may be mounted on the roller 151 and spaced a predetermined distance apart, and the support sheets 153 may extend along a direction perpendicular to the rotation axis R. Alternatively, one support sheet may be mounted or attached to the roller 151. For example, one support sheet may have a size and shape corresponding to the area in which the support sheets 153 are disposed and the area between the support sheets 153 in FIG. 1C. As such, the number, size, or shape of the support sheets 153 may be appropriately changed depending on the product actually manufactured. In various embodiments, as the roller 151 rotates, the support sheet 153 may be rolled up on the outer circumferential surface of the roller 151 or may depart from the roller 151 and unfold in a flat plate shape between the display 103 and the third plate 121*c*. According to an embodiment, the support sheet 153 may, for example, be referred to as a "support belt", "auxiliary belt", "support film" or "auxiliary film".

According to various embodiments, an end of the support sheet 153 may be connected to the first structure 101, e.g., the first plate 111*a* (e.g., slide plate) and, in a closed state (e.g., the state shown in FIG. 1A), the support sheet 153 may be rolled on the roller 151. Therefore, when the first plate 111*a* moves to the opened state (e.g., the state shown in FIG. 1B), the support sheet 153 may be gradually positioned between the second structure 102 (e.g., the third plate 121*c*) and the display 103 (e.g., the second area A2) or between the second structure 102 (e.g., the third plate 121*c*) and the multi-joint hinge structure 113. For example, at least a portion of the support sheet 153 may be positioned to face the multi-joint hinge structure 113 and may be selectively wound around the roller 151 as the first plate 111*a* slides. The support sheet 153 is generally disposed in contact with the multi-joint hinge structure 113, but the portion rolled up around the roller 151 may be substantially separated from the multi-joint hinge structure 113.

According to various embodiments, the gap between the surface of the display 103 and the inner surface of the edge of the second plate 121*a* may differ depending on the degree to which the support sheet 153 is wound around the roller 151. The smaller the gap is, the easier it is to prevent foreign bodies from flowing in, but when the arrangement gap is too small, the display 103 may contact or rub against the second plate 121*a*. When direct contact or friction occurs, the surface of the display 103 may be damaged or the slide of the first structure 101 may be obstructed.

According to various embodiments, the support sheet 153 is wound around the roller 151 in the closed state, thus reducing the gap between the inner surface of the edge of the second plate 121*a* and the surface of the display 103 while keeping the surface of the display 103 not in contact with the second plate 121*a*. For example, it is possible to prevent foreign substances from flowing into the inside of the second structure 102 by reducing the arrangement gap in the closed state. In an embodiment, as the first structure 101 (e.g., the first plate 111*a* or the slide plate) gradually moves to the opened state, the support sheet 153 may move away from the roller 151 and gradually move to the space between the second structure 102 (e.g., the second plate 121*a* or the third plate 121*c*) and the multi-joint hinge structure 113. For example, as the first structure 101 moves to the opened state, the arrangement gap gradually increases, suppressing direct friction or contact between the display 103 and other structures (e.g., the second plate 121*a*) and hence preventing possible damage to the surface of the display 103 due to friction or contact. In various embodiments, the thickness of the support sheet 153 may gradually increase as the distance between an end (e.g., the portion fixed to the roller 151) and the other end (e.g., the portion fixed to the first plate 111*a*) is reduced. Use of the thickness profile of the support sheet 153 allows for adjustment of the arrangement gap in the closed state and the opened state.

According to various embodiments, the electronic device 100 may include at least one elastic member 131 and 133 formed of a low density elastic body such as a sponge or a brush. For example, the electronic device 100 may include a first elastic member 131 mounted on one end of the display 103 and, according to an embodiment, the electronic device 100 may further include a second elastic member 133 mounted on the inner surface of the edge of the second plate 121*a*. The first elastic member 131 may be substantially disposed in the inner space of the second structure 102 and may be positioned to correspond to the edge of the second plate 121*a* in the opened state (e.g., the state shown in FIG. 1B). In an embodiment, the first elastic member 131 may move in the inner space of the second structure 102 as the first structure 101 slides. When the first structure 101 moves from the closed state to the opened state, the first elastic member 131 may move toward the edge of the second plate 121*a*. When the first structure 101 reaches the opened state, the first elastic member 131 may contact the inner surface of the edge of the second plate 121*a*. For example, in the opened state, the first elastic member 131 may seal the gap between the inner surface of the edge of the second plate 121*a* and the surface of the display 103. According to an embodiment, when moving from the closed state to the opened state, the first elastic member 131 may move (e.g., slidingly contact) while in contact with the second plate 121*a*. For example, if a foreign body has been introduced in the gap between the second area A2 and the second plate 121*a* in the closed state, when moving to the opened state, the first elastic member 131 may discharge the foreign body to the outside of the second structure 102.

According to various embodiments, the second elastic member 133 may be attached to the inner surface of the edge of the second plate 121*a*, and may be disposed to substantially face the inner surface of the display 103. In the closed state, the gap (e.g., the arrangement gap) between the surface of the display 103 and the inner edge of the second plate 121*a* may be substantially determined by the second elastic member 133. According to an embodiment, in the closed state, the second elastic member 133 may contact the surface of the display 103, substantially sealing the arrangement gap. According to an embodiment, the second elastic member 133 may be formed of a low-density elastic body such as a sponge or a brush, so that the surface of the display 103 may be prevented from damage despite direct contact with the display 103. According to an embodiment, as the first structure 101 gradually moves to the opened state, the arrangement gap may increase. For example, the display 103 may gradually expose the second area A2 to the outside of the second structure 102 substantially without contacting or rubbing against the second elastic member 133. When the first structure 101 reaches the opened state, the first elastic member 131 may contact the second elastic member 133. According to various embodiments, the electronic device 100 may further include a guide rail(s) 155 and/or an actuating member(s) 157. The guide rail(s) 155 may be mounted on the second structure 102, e.g., the third plate 121*c* to guide a sliding of the first structure 101 (e.g., the first plate 111*a* or the slide plate). The actuating member(s) 157 may include a spring or a spring module that provides an elastic force in a direction to allow both ends thereof to move away from each other. An end of the actuating member(s) 157 may be rotatably supported by the second structure 102, and the other end may be rotatably supported by the first structure 101. When the first structure 101 slides, both the ends of the actuating member(s) 157 may be positioned closest to each other (hereinafter, a 'nearest point') at any one point between the closed state and the opened state. For example, in the interval between the nearest point and the closed state, the actuating member(s) 157 may provide an elastic force to the first structure 101 in a direction moving toward the closed state and, in the interval between the nearest point and the opened state, the actuating member(s) 157 may provide an elastic force to the first structure 101 in a direction moving toward the opened state.

In the following description, the components easy to understand from the description of the above embodiments are denoted with or without the same reference numerals and their detailed description is not repeated. According to an embodiment, an electronic device (e.g., the electronic device 100 of FIGS. 1A to 1C) may be implemented by selectively combining configurations of different embodiments, and the configuration of an embodiment may be replaced by the configuration of another embodiment. However, it is noted that the present disclosure is not limited to a specific drawing or embodiment.

Figure 2:
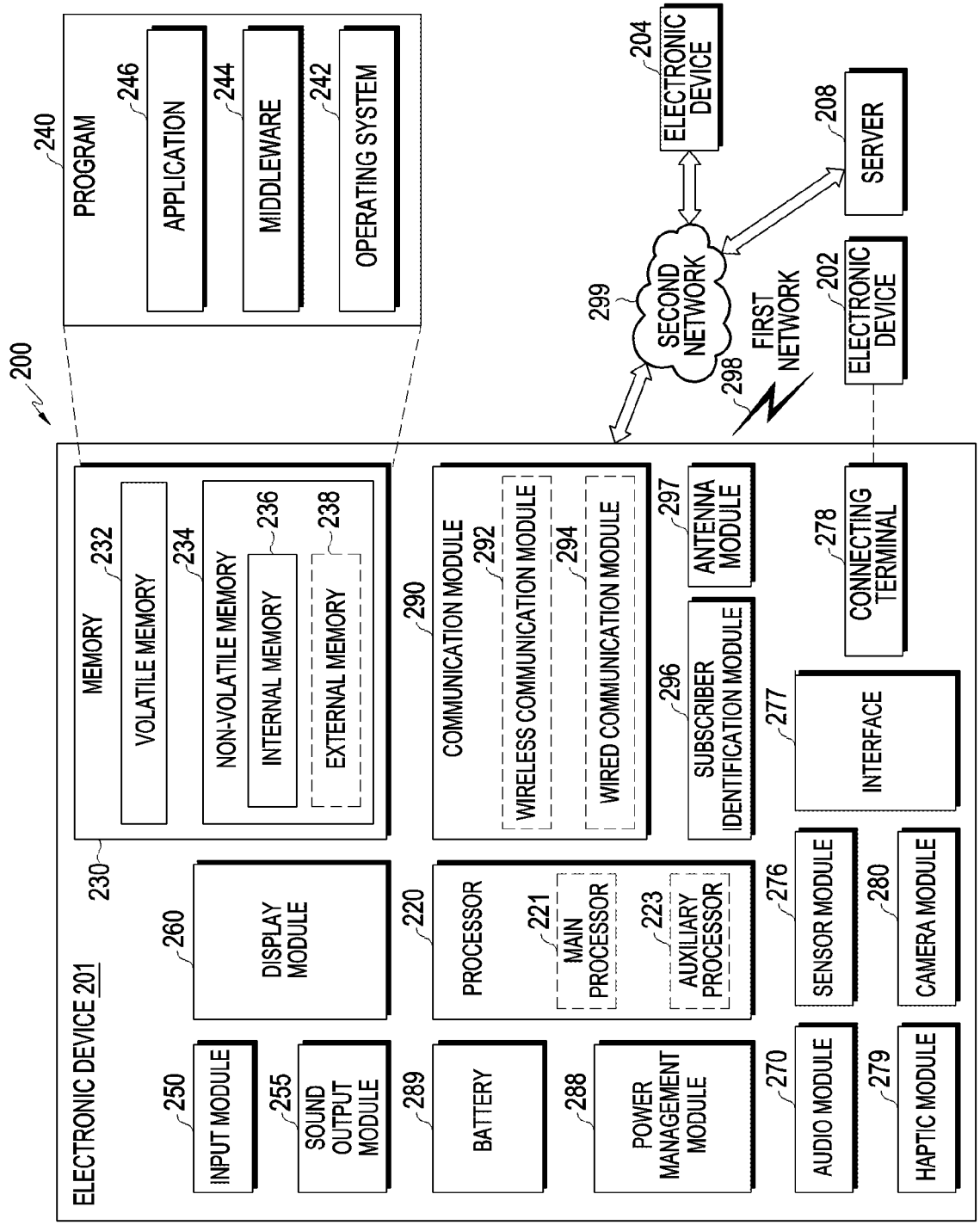
FIG. 2 is a block diagram illustrating an example electronic device in a network environment according to various embodiments.

FIG. 2 is a block diagram illustrating an example electronic device 201 (e.g., the electronic device 100 of FIGS. 1A to 1C) in a network environment 200 according to various embodiments. Referring to FIG. 2, the electronic device 201 in the network environment 200 may communicate with an electronic device 202 via a first network 298 (e.g., a short-range wireless communication network), or an electronic device 204 or a server 208 via a second network 299 (e.g., a long-range wireless communication network). According to an embodiment, the electronic device 201 may communicate with the electronic device 204 via the server 208. According to an embodiment, the electronic device 201 may include a processor 220, memory 230, an input module 250, a sound output module 255, a display module 260 (e.g., the flexible display 103 of FIGS. 1A to 1C), an audio module 270, a sensor module 276, an interface 277, a connecting terminal 278, a haptic module 279, a camera module 280, a power management module 288, a battery 289, a communication module 290, a subscriber identification module (SIM) 296, or an antenna module 297. In various embodiments, at least one (e.g., the connecting terminal 278) of the components may be omitted from the electronic device 201, or one or more other components may be added in the electronic device 201. According to an embodiment, some (e.g., the sensor module 276, the camera module 280, or the antenna module 297) of the components may be integrated into a single component (e.g., the display module 260).

The processor 220 may execute, for example, software (e.g., a program 240) to control at least one other component (e.g., a hardware or software component) of the electronic device 201 coupled with the processor 220, and may perform various data processing or computation. According to an embodiment, as at least part of the data processing or computation, the processor 220 may store a command or data received from another component (e.g., the sensor module 276 or the communication module 290) in volatile memory 232, process the command or the data stored in the volatile memory 232, and store resulting data in non-volatile memory 234. According to an embodiment, the processor 220 may include a main processor 221 (e.g., a central processing unit (CPU) or an application processor (AP)), or an auxiliary processor 223 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 201 includes the main processor 221 and the auxiliary processor 223, the auxiliary processor 223 may be configured to use lower power than the main processor 221 or to be specified for a designated function. The auxiliary processor 223 may be implemented as separate from, or as part of the main processor 221.

The auxiliary processor 223 may control at least some of functions or states related to at least one component (e.g., the display module 260, the sensor module 276, or the communication module 290) among the components of the electronic device 201, instead of the main processor 221 while the main processor 221 is in an inactive (e.g., sleep) state, or together with the main processor 221 while the main processor 221 is in an active state (e.g., executing an application). According to an embodiment, the auxiliary processor 223 (e.g., an image signal processor or a communication processor) may be implemented as part of another component (e.g., the camera module 280 or the communication module 290) functionally related to the auxiliary processor 123. According to an embodiment, the auxiliary processor 223 (e.g., the neural processing unit) may include a hardware structure specified for artificial intelligence model processing. The artificial intelligence model may be generated via machine learning. Such learning may be performed, e.g., by the electronic device 201 where the artificial intelligence is performed or via a separate server (e.g., the server 208). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 230 may store various data used by at least one component (e.g., the processor 220 or the sensor module 276) of the electronic device 201. The various data may include, for example, software (e.g., the program 240) and input data or output data for a command related thereto. The memory 230 may include the volatile memory 232 or the non-volatile memory 234.

The program 240 may be stored in the memory 230 as software, and may include, for example, an operating system (OS) 242, middleware 244, or an application 246.

The input module 250 may receive a command or data to be used by other components (e.g., the processor 220) of the electronic device 201, from the outside (e.g., a user) of the electronic device 201. The input module 250 may include, for example, a microphone, a mouse, a keyboard, keys (e.g., buttons), or a digital pen (e.g., a stylus pen).

The sound output module 255 may output sound signals to the outside of the electronic device 201. The sound output module 255 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 260 may visually provide information to the outside (e.g., a user) of the electronic device 201. The display 260 may include, for example, a display, a hologram device, or a projector and control circuitry to control a corresponding one of the display, hologram device, and projector. According to an embodiment, the display 260 may include a touch sensor configured to detect a touch, or a pressure sensor configured to measure the intensity of a force generated by the touch.

The audio module 270 may convert a sound into an electrical signal and vice versa. According to an embodiment, the audio module 270 may obtain the sound via the input module 250, or output the sound via the sound output module 255 or a headphone of an external electronic device (e.g., an electronic device 202) directly (e.g., wiredly) or wirelessly coupled with the electronic device 201.

The sensor module 276 may detect an operational state (e.g., power or temperature) of the electronic device 201 or an environmental state (e.g., a state of a user) external to the electronic device 201, and then generate an electrical signal or data value corresponding to the detected state. According to an embodiment, the sensor module 276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 277 may support one or more specified protocols to be used for the electronic device 201 to be coupled with the external electronic device (e.g., the electronic device 202) directly (e.g., wiredly) or wirelessly. According to an embodiment, the interface 277 may include, for example, a high definition multimedia interface (HDMI), a universal serial bus (USB) interface, a secure digital (SD) card interface, or an audio interface.

A connecting terminal 278 may include a connector via which the electronic device 201 may be physically connected with the external electronic device (e.g., the electronic device 202). According to an embodiment, the connecting terminal 278 may include, for example, a HDMI connector, a USB connector, a SD card connector, or an audio connector (e.g., a headphone connector).

The haptic module 279 may convert an electrical signal into a mechanical stimulus (e.g., a vibration or motion) or electrical stimulus which may be recognized by a user via his tactile sensation or kinesthetic sensation. According to an embodiment, the haptic module 279 may include, for example, a motor, a piezoelectric element, or an electric stimulator.

The camera module 280 may capture a still image or moving images. According to an embodiment, the camera module 280 may include one or more lenses, image sensors, image signal processors, or flashes.

The power management module 288 may manage power supplied to the electronic device 201. According to an embodiment, the power management module 288 may be implemented as at least part of, for example, a power management integrated circuit (PMIC).

The battery 289 may supply power to at least one component of the electronic device 201. According to an embodiment, the battery 289 may include, for example, a primary cell which is not rechargeable, a secondary cell which is rechargeable, or a fuel cell.

The communication module 290 may support establishing a direct (e.g., wired) communication channel or a wireless communication channel between the electronic device 201 and the external electronic device (e.g., the electronic device 202, the electronic device 204, or the server 208) and performing communication via the established communication channel. The communication module 290 may include one or more communication processors that are operable independently from the processor 220 (e.g., the application processor (AP)) and supports a direct (e.g., wired) communication or a wireless communication. According to an embodiment, the communication module 290 may include a wireless communication module 292 (e.g., a cellular communication module, a short-range wireless communication module, or a global navigation satellite system (GNSS) communication module) or a wired communication module 294 (e.g., a local area network (LAN) communication module or a power line communication (PLC) module). A corresponding one of these communication modules may communicate with the external electronic device 204 via a first network 298 (e.g., a short-range communication network, such as Bluetooth™, wireless-fidelity (Wi-Fi) direct, or infrared data association (IrDA)) or a second network 299 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 292 may identify or authenticate the electronic device 201 in a communication network, such as the first network 298 or the second network 299, using subscriber information (e.g., international mobile subscriber identity (IMSI)) stored in the subscriber identification module 296.

The wireless communication module 292 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 292 may support a high-frequency band (e.g., the mmWave band) to achieve, e.g., a high data transmission rate. The wireless communication module 292 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 292 may support various requirements specified in the electronic device 201, an external electronic device (e.g., the electronic device 204), or a network system (e.g., the second network 299). According to an embodiment, the wireless communication module 292 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 297 may transmit or receive a signal or power to or from the outside (e.g., the external electronic device). According to an embodiment, the antenna module 297 may include one antenna including a radiator formed of or including a conductor or conductive pattern formed on a substrate (e.g., a printed circuit board (PCB)). According to an embodiment, the antenna module 297 may include a plurality of antennas (e.g., an antenna array). In this case, at least one antenna appropriate for a communication scheme used in a communication network, such as the first network 298 or the second network 299, may be selected from the plurality of antennas by, e.g., the communication module 290. The signal or the power may then be transmitted or received between the communication module 290 and the external electronic device via the selected at least one antenna. According to an embodiment, other parts (e.g., radio frequency integrated circuit (RFIC)) than the radiator may be further formed as part of the antenna module 297.

According to various embodiments, the antenna module 297 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 201 and the external electronic device 204 via the server 208 coupled with the second network 299. The external electronic devices 202 or 204 each may be a device of the same or a different type from the electronic device 201. According to an embodiment, all or some of operations to be executed at the electronic device 201 may be executed at one or more of the external electronic devices 202, 204, or 208. For example, if the electronic device 201 should perform a function or a service automatically, or in response to a request from a user or another device, the electronic device 201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 201. The electronic device 201 may provide the outcome, with or without further processing of the outcome, as at least part of a reply to the request. To that end, a cloud computing, distributed computing, mobile edge computing (MEC), or client-server computing technology may be used, for example. The electronic device 201 may provide ultra low-latency services using, e.g., distributed computing or mobile edge computing. In an embodiment, the external electronic device 204 may include an Internet-of-things (IoT) device. The server 208 may be an intelligent server using machine learning and/or a neural network. According to an embodiment, the external electronic device 204 or the server 208 may be included in the second network 299. The electronic device 201 may be applied to intelligent services (e.g., smart home, smart city, smart car, or health-care) based on 5G communication technology or IoT-related technology.

Figure 3:
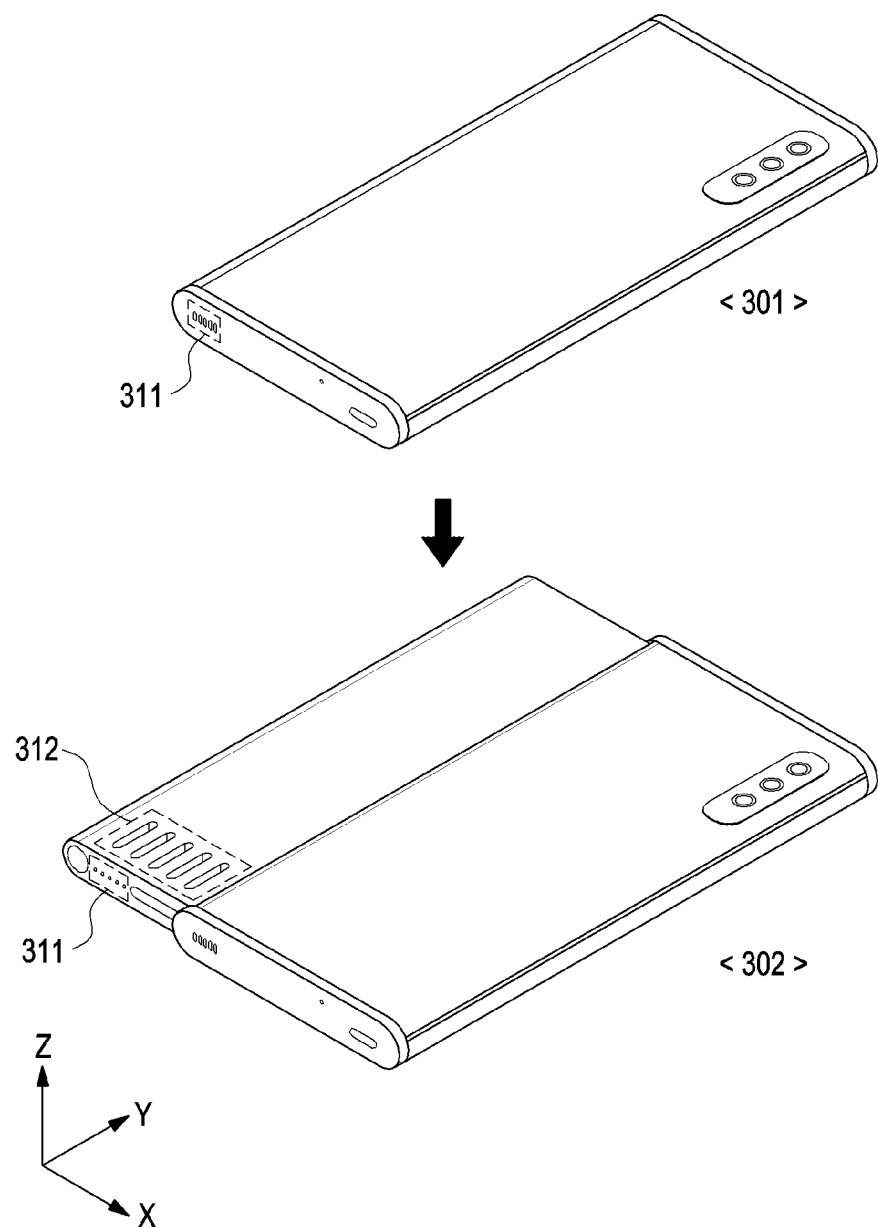
FIG. 3 is a view illustrating a structure of a speaker exposed to the outside of a housing of an example electronic device as the housing is extended according to various embodiments.

FIG. 3 is a view illustrating a structure of a speaker (e.g., the sound output module 255 of FIG. 2) exposed to the outside of a housing (e.g., the housing 101 of FIGS. 1A to 1C) of an example electronic device (e.g., the electronic device 201 of FIG. 2) as the housing is extended according to various embodiments.

According to various embodiments, the speaker 255 may be implemented so that while the state of the housing 101 is the normal state, the first external speaker hole of the speaker 255 is exposed to the outside of the electronic device 201, and the second external speaker hole of the speaker 255 is not exposed to the outside of the electronic device 201 by the rear structure of the housing. The "normal state of the housing 101" may refer, for example, to the state (e.g., closed state) illustrated in FIG. 1A. For example, referring to <301> of FIG. 3, the speaker 255 may be implemented so that while the state of the housing 101 is the normal state, the first external speaker hole 311 (e.g., the speaker hole 145a of FIG. 1) is exposed to the outside, and the second external speaker hole 312 is not exposed to the outside by the rear structure (e.g., the second plate 121a of the second structure 102 of FIG. 1C) of the housing.

According to various embodiments, the speaker 255 may be implemented so that while the state of the housing 101 is the extended state, at least some of the first external speaker holes of the speaker 255 and the second external speaker holes of the speaker 255 are exposed to the outside of the electronic device 201. The "extended state of the housing 101" may refer, for example, to a state in which the flexible display 260 is rendered to have a larger area than the area exposed to the outside in the normal state by a slide-out motion for the housing 101. Among the extended states, a state in which the area of the flexible display 260, exposed to the outside, is maximized may refer, for example, to the state (e.g., opened state) shown in FIG. 1B. For example, referring to <302> of FIG. 3, the speaker 255 may be implemented so that while the state of the housing 101 is the extended state, at least some of the first external speaker holes 311 and the second external speaker holes 312 are exposed to the outside. According to an embodiment, the first external speaker hole 311 may be implemented to be disposed in a first direction (e.g., the X-axis direction of FIG. 3) toward a specific side wall (e.g., the second side wall 123b and/or third side wall 123c of FIG. 1A) of the electronic device 201, and the second external speaker hole 312 may be implemented to be disposed in a second direction (e.g., the Y-axis direction of FIG. 3) toward the rear structure (e.g., the second plate 121a) of the housing of the electronic device 201, different from the first direction (e.g., the X-axis direction of FIG. 3).

Figure 4:
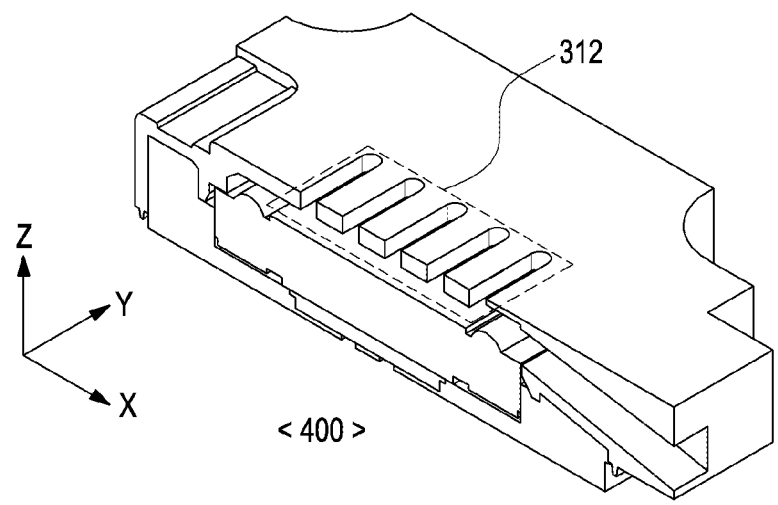
FIG. 4 is a view illustrating a structure of a speaker in an extended state of a housing of an example electronic device according to various embodiments.
Figure 4:
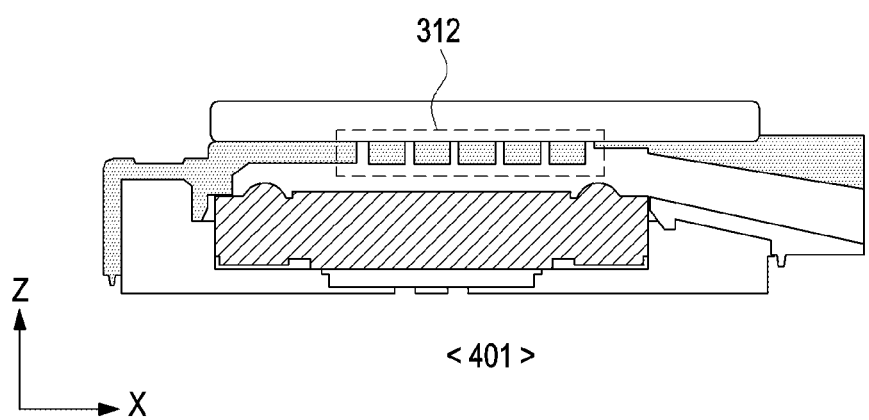
Figure 4:
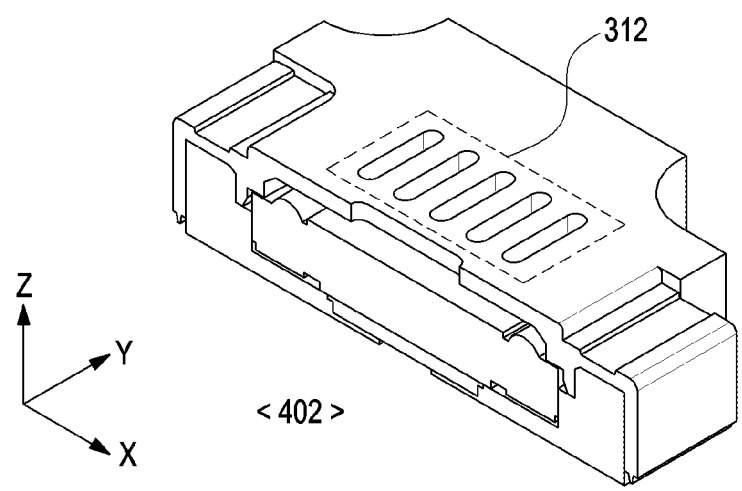

FIG. 4 is a view illustrating a structure of a speaker (e.g., the sound output module 255 of FIG. 2) in the extended state of an example electronic device (e.g., the electronic device 201 of FIG. 2) according to various embodiments.

<400> of FIG. 4 is a cross-sectional view taken in the X-axis direction of the speaker 255 exposed to the outside in FIG. 3.

According to various embodiments, the second external speaker holes (e.g., the second external speaker holes 312 of FIG. 3) may be implemented so that the number of the holes increases while a slide-out motion proceeds for the electronic device 201.

For example, referring to <401> of FIG. 4, when the number of the second external speaker holes 312 of the speaker 255 is three, and the slide housing 101 moves in the X-axis direction as the speaker 255 is slid into the main housing 102, (1) one speaker hole of the second external speaker holes 312 may be exposed to the outside while the state of the housing 101 is in a first extended state (e.g., 25% extended) by a first slide-out motion, (2) three speaker holes of the second external speaker holes 312 may be exposed to the outside while the state of the housing 101 is a second extended state (e.g., 50% extended) by a second slide-out motion, and (3) five speaker holes of the second external speaker holes 312 may be exposed to the outside while the state of the housing 101 is a third extended state (e.g., 100% extended) by a third slide-out motion. In the above-described example, one of ordinary skill in the art will readily understand that the first extended state to the third extended state are merely examples, and the extended state of the electronic device 201 is not limited to the above example.

According to various embodiments, the second external speaker holes 312 may be formed to be spaced apart from each other by a predetermined gap. For example, referring to <402> of FIG. 4, the first external speaker holes (e.g., a first external speaker holes (311) of FIG. 3) may be formed to have a structure capable of delivering, to the outside, the sound output from the speaker 255 in either the normal state or extended state while the second external speaker holes 312 may be formed to have a structure in which the number of speaker holes exposed to the outside increases in proportion to the externally exposed area of the flexible display 260 according to the slide-out motion.

Figure 5:
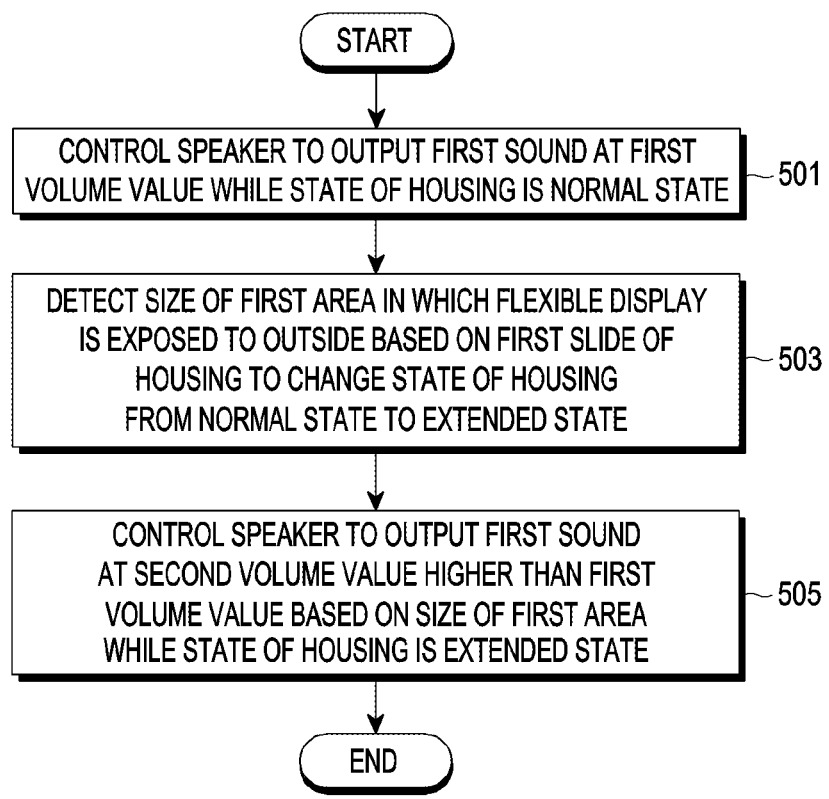
FIG. 5 is a flowchart illustrating an operation method of an example electronic device according to various embodiments.

FIG. 5 is a flowchart illustrating an operation method of an example electronic device (e.g., the electronic device 201 of FIG. 2) according to various embodiments.

Figure 6A:
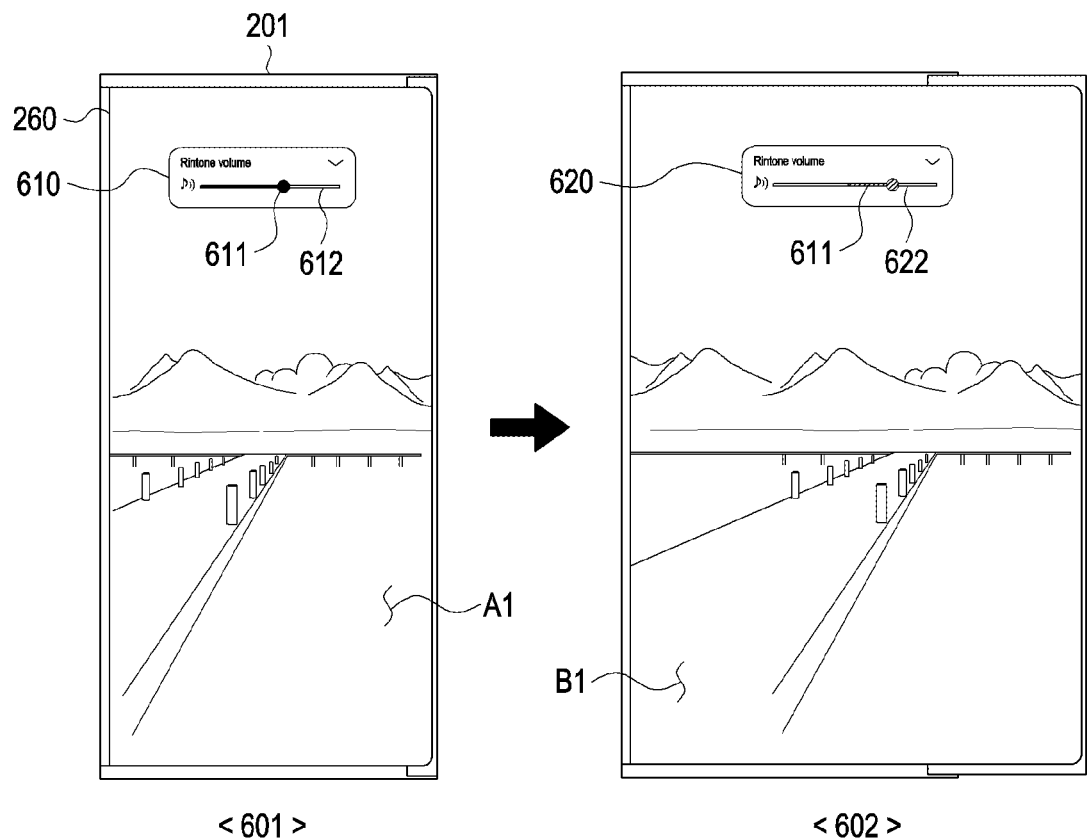
FIG. 6A is a view illustrating an operation of displaying an object representing a volume level in a normal state and extended state of an example electronic device according to various embodiments.
Figure 6A:
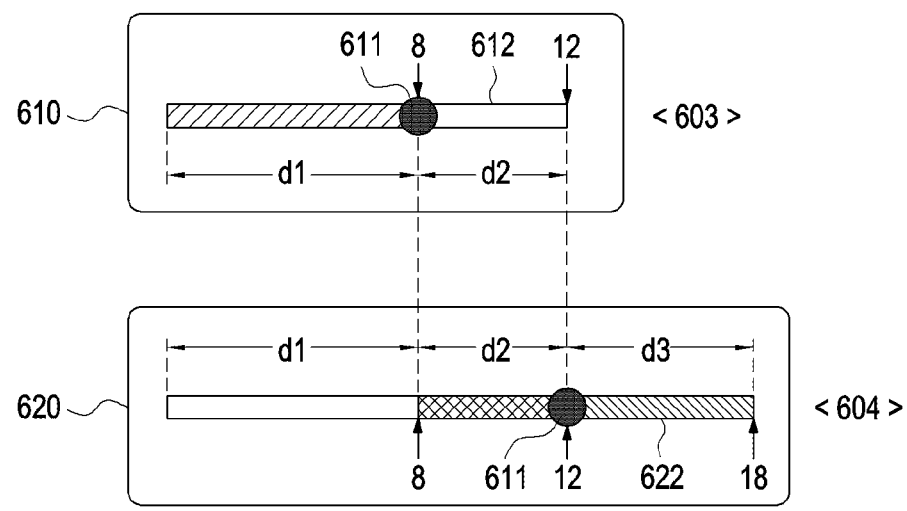

FIG. 6A is a view illustrating an example operation of displaying an object representing a volume level in a normal state and extended state of an electronic device 201 according to various embodiments.

Figure 6B:
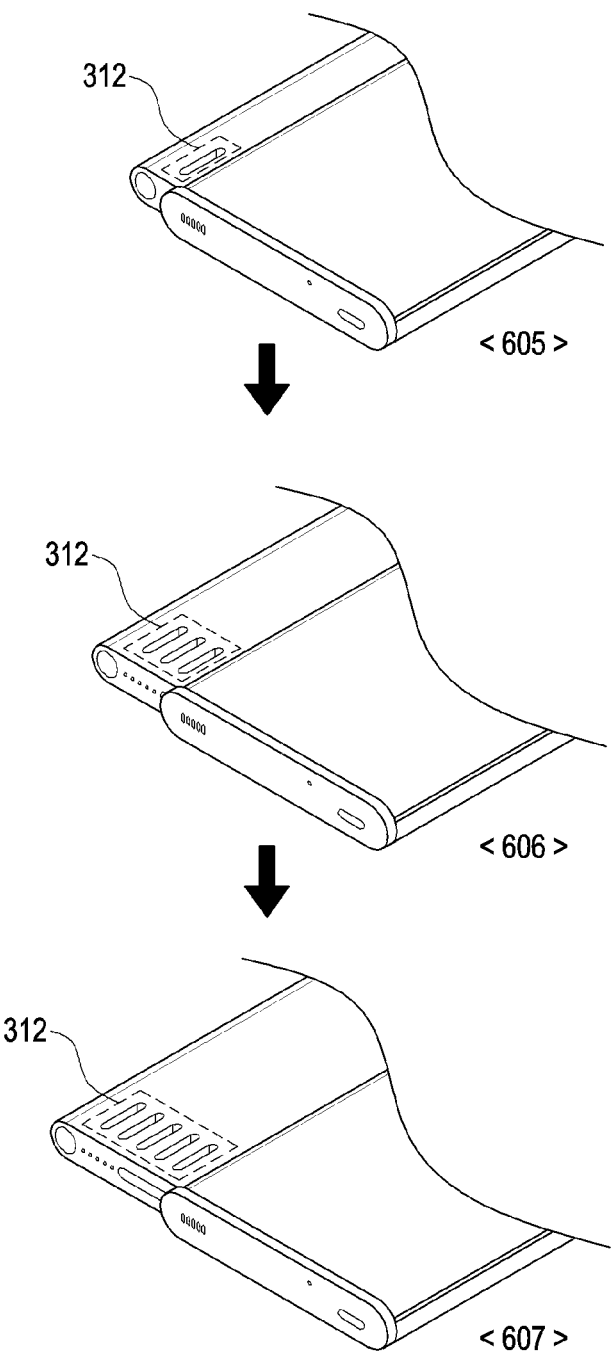
FIG. 6B is a view illustrating a plurality of extended states of an example housing according to various embodiments.

FIG. 6B is a view illustrating a plurality of extended states of an example housing (e.g., the housing 101 of FIGS. 1A to 1C) according to various embodiments.

In operation 501, according to various embodiments, the electronic device 201 (e.g., the processor 220 of FIG. 2) may control the speaker (e.g., the sound output module 255 of FIG. 2) to output a first sound at a first volume value while the state of the housing 101 is the normal state. According to an embodiment, the electronic device 201 may set the output volume of the first sound to the first volume value while the state of the housing 101 is the normal state and control the speaker 255 to output the first sound having the first volume value based on a request for outputting the first sound. According to an embodiment, the electronic device 201 may set the maximum volume of the first sound, which may be output through the speaker 255, to a first maximum volume value while the state of the housing 101 is the normal state.

According to various embodiments, while the state of the housing 101 is the normal state, the electronic device 201 (e.g., the processor 220 of FIG. 2) may control the speaker 255 to output the first sound at the first volume value while controlling the flexible display 260 to display a first object of a first size indicating the output state of the first sound. For example, referring to <601> of FIG. 6A, while the state of the housing 101 is the normal state, the electronic device 201 may control the speaker 255 to output the first sound having the first volume value (e.g., 10 dB) while displaying the first object 610 of the first size indicating the output state of the first sound. According to an embodiment, the first object may indicate the output state (or setting state) of sound and may be an object set to be able to change the output state of sound. According to an embodiment, the first object may include a volume indicator and a volume status bar. The volume indicator may indicate the current volume value of sound, and the volume status bar may indicate a range of outputable volume values and include information regarding the maximum volume value. For example, referring to <601> of FIG. 6A, the first object 610 may include a volume indicator 611 indicating the current volume value of the first sound and a volume status bar 612 indicating a range of outputable volume values of the first sound. For example, referring to <603> of FIG. 6A, while the state of the housing 101 is the normal state, the electronic device 201 may control the speaker 255 to output the first sound having the first volume value (e.g., 10 dB) while displaying the first object 610 of the first size to position the volume indicator 611 to a first sound level (e.g., level 8) indicating the first volume value in the volume status bar 612. In this case, the rightmost portion of the volume status bar 612 may refer, for example, to the first maximum sound level (e.g., level 12) indicating the first maximum volume value (e.g., 15 dB) of the first sound. According to an embodiment, the first object may indicate the output state of a plurality of types of sounds. For example, the first object may indicate the output state of at least one sound of a first type (e.g., ringtone type), a second type (e.g., media type), a third type (e.g., notification type), or a fourth type (e.g., system sound type). In the above-described example, one of ordinary skill in the art will readily understand that the first type to fourth type are merely examples, and the plurality of types of sounds are not limited to the above examples.

In operation 503, according to various embodiments, the electronic device 201 (e.g., the processor 220 of FIG. 2) may identify the size of the first area of the flexible display 260 exposed to the outside based on a first sliding of the housing 101 to change the state of the housing 101 from the normal state to the extended state. For example, referring to <602> of FIG. 6A, the electronic device 201 may identify the size of the first area B1 exposed to the outside of the flexible display 260, corresponding to the extended state, based on detecting a slide-out motion in the normal state. The method for identifying the size of the first area may include various methods known or apparent to one of ordinary skill in the art.

In operation 505, according to various embodiments, as a sound optimization function, the electronic device 201 (e.g., the processor 220 of FIG. 2) may control the speaker 255 to output the first sound at a second volume value higher than the first volume value, based on the size of the first area while the state of the housing 101 is the extended state. According to an embodiment, while the state of the housing 101 is the extended state, the electronic device 201 may set the output volume of the first sound to the second volume value based on the size of the first area and may control the speaker 255 to output the first sound having the second volume value based on a request for outputting the first sound. For example, referring to FIG. 6B, the electronic device 201 may control the speaker 255 to output the first sound having a first specific volume value corresponding to a first size of the first area while in a first extended state <605> in which one second external speaker hole 312 is exposed, to output the first sound having a second specific volume value corresponding to a second size of the first area while in a second extended state <606> in which three second external speaker holes 312 are exposed, and to output the first sound having a third specific volume value corresponding to a third size of the first area while in a third extended state <607> in which five second external speaker holes 312 are exposed. In this case, the third specific volume value may be higher than the second specific volume value, and the second specific volume value may be higher than the first specific volume value. According to an embodiment, while the state of the housing 101 is the extended state, the electronic device 201 may set the maximum volume of the first sound to a second maximum volume value higher than the first maximum volume value based on the size of the first area. For example, referring to FIG. 6B, the electronic device 201 may set the maximum volume of the first sound to a first specific maximum volume value corresponding to the first size of the first area while in a first extended state <605>, set the maximum volume of the first sound to a second specific maximum volume value corresponding to the second size of the first area while in a second extended state <606>, and set the maximum volume of the first sound to a third specific maximum volume value corresponding to the third size of the first area while in a third extended state <607>. In this case, the third specific maximum volume value may be higher than the second specific maximum volume value, and the second specific maximum volume value may be higher than the first specific maximum volume value. According to an embodiment, the electronic device 201 may increase the current volume value and maximum volume value of the first sound by an extension ratio from the area A1 exposed to the outside in the normal state to the first area B1 exposed to the outside in the extended state.

According to various embodiments, while the state of the housing 101 is the extended state, the electronic device 201 (e.g., the processor 220 of FIG. 2) may control the speaker 255 to output the first sound at the second volume value while controlling the flexible display 260 to display the first object of a second size, extended based on the size of the first area. For example, referring to <602> of FIG. 6A, while the state of the housing 101 is the extended state, the electronic device 201 may control the speaker 255 to output the first sound having the second volume value (e.g., 15 dB) higher than the first volume value (e.g., 10 dB) while displaying the first object 620, extended from the first size to the second size, based on the size of the first area B1. According to an embodiment, the electronic device 201 may control the display of the first object while changing the output volume of the first sound according to the sound optimization function.

According to an embodiment, the electronic device 201 may identify the extended size of the first object (or the extended area of the first object) corresponding to the size of the first area while the state of the housing 101 is the extended state. For example, the electronic device 201 may identify a table defining the extended size of the first object for each size of the first area stored in a memory (e.g., the memory 230 of FIG. 2) and may extend the first object 610 according to the extended size (e.g., second size) of the first object corresponding to the size of the first area identified from the table and display the first object 620 extended in the second size. As another example, referring to <601> and <602> of FIG. 6A, the electronic device 201 may identify the ratio of extension from the area A1 exposed to the outside in the normal state to the first area B1 exposed to the outside in the extended state, extend the size of the first object 610 from the first size to the second size by the extended ratio, and display the first object 620 extended in the second size.

According to an embodiment, while the state of the housing 101 is the extended state, the electronic device 201 may extend the length of the volume status bar 612 and change the position of the volume indicator 611 using the ratio of extension from the normal state to the extended state. For example, referring to <604> of FIG. 6A, when the size of the first area B1 exposed to the outside in the extended state is 1.5 times the size of the area A1 exposed to the outside in the normal state, the electronic device 201 may display a second object 620 of the second size to position the volume indicator 611 to the second sound level (e.g., 12 level) indicating the second volume value (e.g., 15 dB) in the volume status bar 622 that has been extended by the second maximum sound level (e.g., level 18 obtained by applying (e.g., multiplying) the extension ratio (e.g., 1.5 times) to the first maximum sound level (e.g., level 12) indicating the first maximum volume value (e.g., 15 dB). The above-described formula is an example, and the extension ratio may be calculated by other various methods.

According to an embodiment, while the state of the housing 101 is the extended state, the electronic device 201 may apply a first effect in a first section of the volume status bar, a second effect in a second section, and a third effect in a third section. For example, referring to <604> of FIG. 6A, the first section d1 may indicate a section from the lowest sound level (e.g., level 0) to the position where the volume indicator 611 is positioned in the normal state, the second section d2 may indicate a section where the volume indicator 611 has been moved from the normal state to the extended state, and the third section d3 may indicate a section from the position of the volume indicator 611 in the extended state to the maximum sound level (e.g., level 18). Different effects (e.g., color effects or shadow effects) may be applied to the first section, the second section, and the third section.

Figure 7:
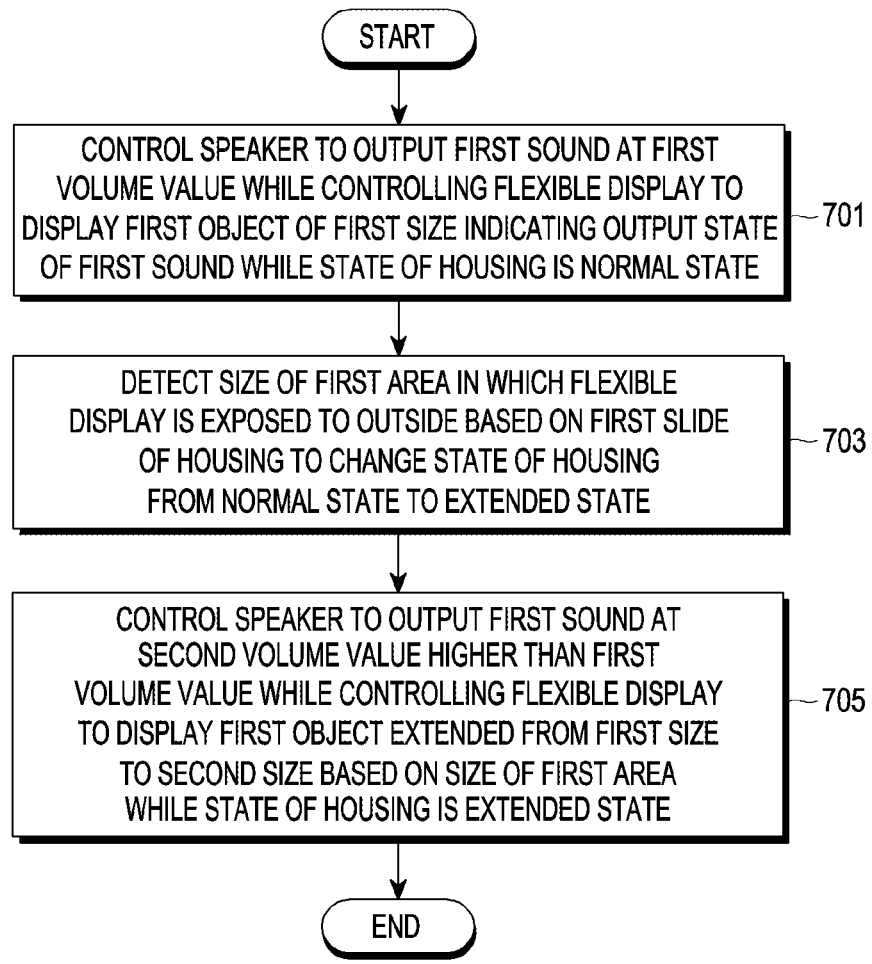
FIG. 7 is a flowchart illustrating an operation method of an example electronic device according to various embodiments.

FIG. 7 is a flowchart illustrating an operation method of an example electronic device (e.g., the electronic device 201 of FIG. 2) according to various embodiments.

According to various embodiments, in operation 701, while the state of the housing (e.g., the housing 101 of FIGS. 1A to 1C) is the normal state, the electronic device 201 (e.g., the processor 220 of FIG. 2) may control the speaker (e.g., the sound output module 255 of FIG. 2) to output the first sound at the first volume value while controlling the flexible display 260 to display a first object of a first size indicating the output state of the first sound. For example, referring to <603> of FIG. 6A, while the state of the housing 101 is the normal state, the electronic device 201 may control the speaker 255 to output the first sound having the first volume value (e.g., 10 dB) while displaying the first object 610 of the first size to position the volume indicator (e.g., the volume indicator 611 of FIG. 6A) to a first sound level (e.g., level 8) indicating the first volume value in the volume status bar (e.g., the volume status bar 612 of FIG. 6A). In this case, the rightmost portion of the volume status bar 612 may refer, for example, to the first maximum sound level (e.g., level 12) indicating the maximum volume value (e.g., 15 dB) of the first sound.

In operation 703, according to various embodiments, the electronic device 201 (e.g., the processor 220 of FIG. 2) may identify (or detect) the size of the first area of the flexible display 260 exposed to the outside based on a first slide of the housing 101 to change the state of the housing 101 from the normal state to the extended state. For example, referring to <602> of FIG. 6A, the electronic device 201 may identify the size of the first area B1 exposed to the outside of the flexible display 260, corresponding to the extended state, based on detecting a slide-out motion in the normal state.

In operation 705, according to various embodiments, as the sound optimization function, while the state of the housing 101 is the extended state, the electronic device 201 (e.g., the processor 220 of FIG. 2) may control the speaker 255 to output the first sound at the second volume value higher than the first volume value while controlling the flexible display 260 to display the first object extended from the first size to the second size, based on the size of the first area. According to an embodiment, the electronic device 201 may control the display of the first object while maintaining the output volume of the first sound according to the sound optimization function.

According to an embodiment, the electronic device 201 may identify (or detect) the extended size of the first object (or the extended area of the first object) corresponding to the size of the first area while the state of the housing 101 is the extended state. For example, the electronic device 201 may identify a table defining the extended size of the first object for each size of the first area stored in a memory (e.g., the memory 230 of FIG. 2) and may extend the first object 610 according to the extended size (e.g., second size) of the first object corresponding to the size of the first area identified from the table and display the first object 620 extended in the second size. As another example, referring to <601> and <602> of FIG. 6A, the electronic device 201 may identify the ratio of extension from the area A1 exposed to the outside in the normal state to the first area B1 exposed to the outside in the extended state, extend the size of the first object 610 from the first size to the second size by the extended ratio, and display the first object 620 extended in the second size.

According to an embodiment, while the state of the housing 101 is the extended state, the electronic device 201 may extend the length of the volume status bar 612 and change the position of the volume indicator 611 using the ratio of extension from the normal state to the extended state. For example, referring to <604> of FIG. 6A, when the size of the first area B1 exposed to the outside in the extended state is 1.5 times the size of the area A1 exposed to the outside in the normal state, the electronic device 201 may identify the second sound level (e.g., level 12) and the second maximum sound level (e.g., level 18) obtain by applying (e.g., multiplying) the extension ratio (e.g., 1.5 times) to the first sound level (e.g., level 8) indicating the first volume value (e.g., 10 dB) and the first maximum sound level (e.g., level 12) indicating the maximum volume value (e.g., 15 dB), respectively and display the first object 620 of the second size to position the volume indicator 611 to the second sound level in the volume status bar 622 whose length has been extended by the second maximum sound level. In this case, the rightmost portion of the volume status bar 622 may refer, for example, to the second maximum sound level (e.g., level 18) indicating the maximum volume value (e.g., 22.5 dB) of the first sound. The above-described formula is an example, and the extension ratio may be calculated by other various methods.

Figure 8A:
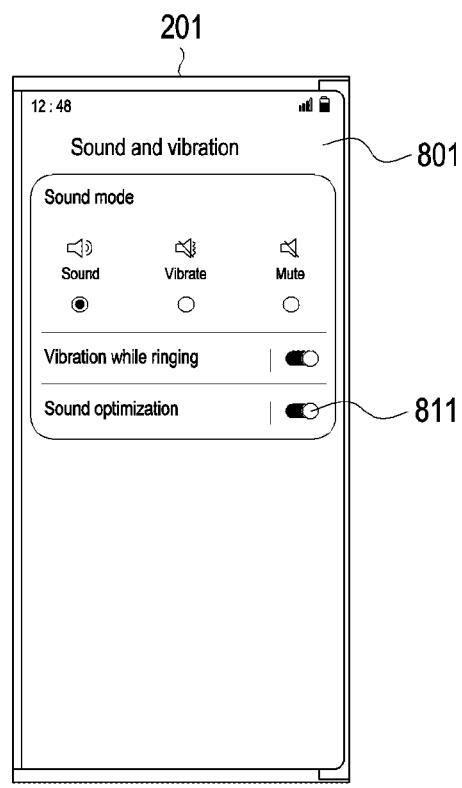
FIG. 8A is a view illustrating an example electronic device which identifies a request for activating a sound optimization function according to various embodiments.

FIG. 8A is a view illustrating an example of identifying a request for activating the sound optimization function by an example electronic device (e.g., the electronic device 201 of FIG. 2) according to various embodiments.

Figure 8B:
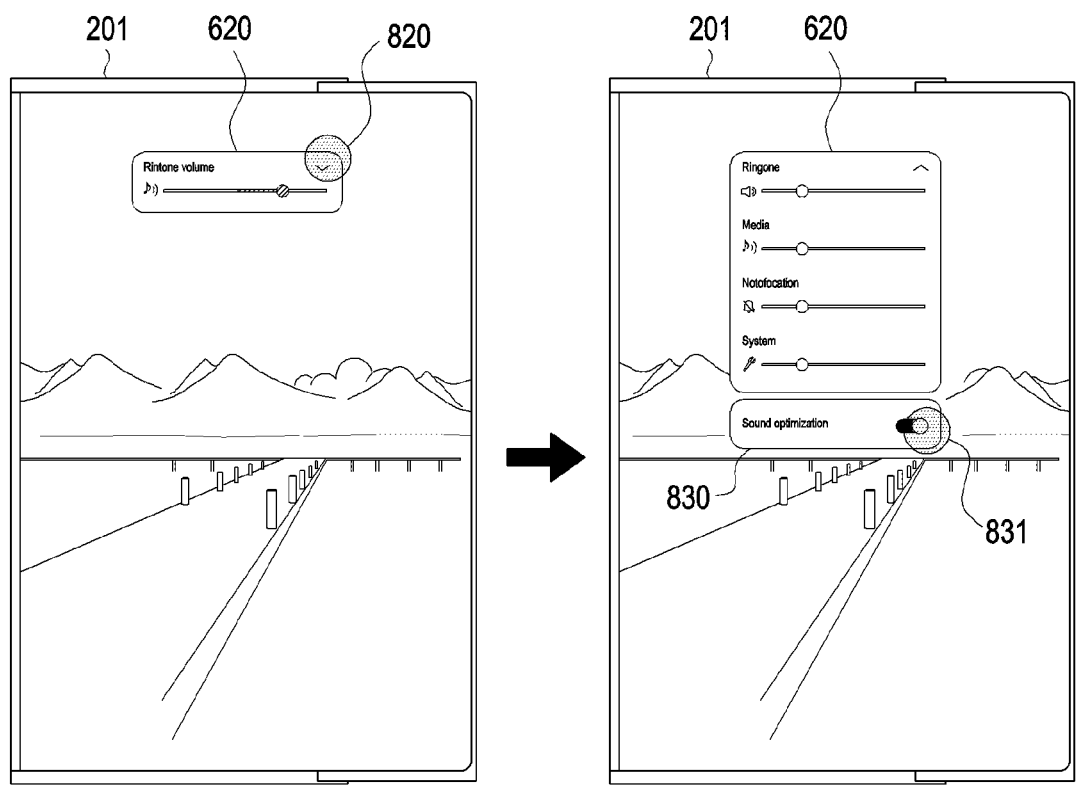
FIG. 8B is a view illustrating an example electronic device which identifies a request for activating a sound optimization function according to various embodiments.

FIG. 8B is a view illustrating an example in which an example electronic device 201 identifies a request for activating a sound optimization function according to various embodiments.

According to various embodiments, the electronic device 201 (e.g., the processor 220 of FIG. 2) may activate the sound optimization function based on a user input identified through a setting screen related to the sound of the electronic device 201. For example, referring to FIG. 8A, the electronic device 201 may display a setting screen 801 related to sound and the sound optimization function may be activated based on a user input of selecting the object 811 (e.g., a toggle button) for activating the sound optimization function.

According to various embodiments, the electronic device 201 (e.g., the processor 220 of FIG. 2) may activate the sound optimization function based on a user input identified through the extended first object (e.g., the extended first object 620 of FIG. 6A) while the state of the housing 101 is the extended state. For example, referring to FIG. 8B, while the state of the housing 101 is the extended state, the electronic device 201 may display at least a portion of the extended first object 620 and display a screen 830 inquiring whether to activate the sound optimization function along with the entire screen of the extended first object 620, based on a first user input to display the entire screen of the extended first object 620. In this case, the electronic device 201 may activate the sound optimization function based on a second user input 831 to select an object (e.g., a toggle button) to activate the sound optimization function included in the screen 830. According to an embodiment, the electronic device 201 may activate the sound optimization function based on a user input identified through the first object (e.g., the first object 610 of FIG. 6A) while the state of the housing 101 is the normal state. For example, while the state of the housing 101 is the normal state, the electronic device 201 may display a screen to inquire whether to activate the sound optimization function along with the entire screen of the first object 610 and activate the sound optimization function based on a user input to select the object to activate the sound optimization function. According to various embodiments, the electronic device 201 may perform various operations described in this disclosure while the sound optimization function is activated.

Figure 9:
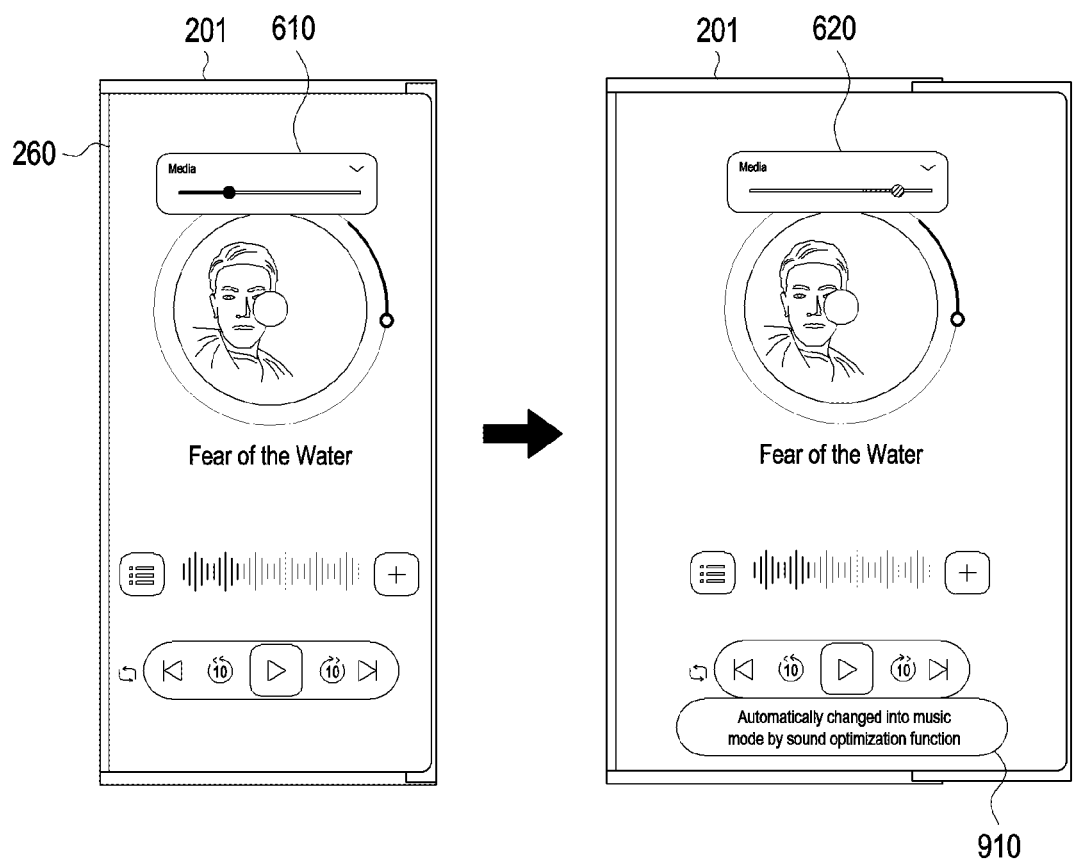
FIG. 9 is a view illustrating an example electronic device which executes a sound optimization function according to an extended state of a housing while executing a first application according to various embodiments.

FIG. 9 is a view illustrating an example in which an example electronic device (e.g., the electronic device 201 of FIG. 2) executes a sound optimization function according to the extended state of a housing (e.g., the housing 101 of FIGS. 1A to 1C) while executing a first application. In the following description, it is assumed that the sound optimization function of the electronic device 201 has been activated according to FIGS. 8A and 8B or some other sound optimization function activation process.

According to various embodiments, while the first application is running in the normal state of the housing 101, the electronic device 201 (e.g., the processor 220 of FIG. 2) may set the output volume of the first sound to a first volume value and control the speaker (e.g., the sound output module 255) to output the first sound having the first volume value. For example, referring to FIG. 9, the electronic device 201 may set the output volume of the first sound to the first volume value while a music application is running in the normal state of the housing 101 and control the speaker 255 to output the first sound having the first volume value. According to an embodiment, the electronic device 201 may set the maximum volume of the first sound, which may be output through the speaker 255, to a first maximum volume value while the state of the housing 101 is the normal state. According to an embodiment, while the first application is running in the normal state of the housing 101, the electronic device 201 may control the flexible display 260 to display a first object of a first size indicating the output state of the first sound of a first type corresponding to the first application. For example, referring to FIG. 9, while the state of the housing 101 is the normal state, the electronic device 201 may control the speaker 255 to output the first sound having the first volume value while displaying the first object 610 of the first size indicating the output state of the first sound of the media type corresponding to a music application.

According to various embodiments, the electronic device 201 (e.g., the processor 220 of FIG. 2) may identify the size of the first area of the flexible display 260 exposed to the outside based on a first slide of the housing 101 to change the state of the housing 101 from the normal state to the extended state.

According to various embodiments, according to operation 505 of FIG. 5, while the state of the housing 101 is the extended state, the electronic device 201 (e.g., the processor 220 of FIG. 2) may set the output volume of the first sound to the second volume value higher than the first volume value based on the size of the first area and control the speaker 255 to output the first sound having the second volume value. According to an embodiment, while the state of the housing 101 is the extended state, the electronic device 201 may set the maximum volume of the first sound to a second maximum volume value higher than the first maximum volume value based on the size of the first area. According to an embodiment, while the state of the housing 101 is the extended state, the electronic device 201 may control the speaker 255 to output the first sound at the second volume value while controlling the flexible display 260 to display the first object extended from the first size to the second size, based on the size of the first area. For example, referring to FIG. 9, while the state of the housing 101 is the extended state, the electronic device 201 may display the first object 620 extended in the second size corresponding to the size of the first area while controlling the speaker 255 to output the first sound having the second volume value. According to an embodiment, the electronic device 201 may control the display of the first object 610 and the extended first object 620 using the method described in connection with operation 505 of FIG. 5.

According to various embodiments, according to operation 705 of FIG. 7, while the state of the housing 101 is the extended state, the electronic device 201 (e.g., the processor 220 of FIG. 2) may control the speaker 255 to output the first sound at the second volume value while controlling the flexible display 260 to display the first object extended from the first size to the second size, based on the size of the first area. For example, referring to FIG. 9, while the state of the housing 101 is the extended state, the electronic device 201 may display the first object 620 extended in the second size corresponding to the size of the first area while controlling the speaker 255 to output the first sound having the second volume value. According to an embodiment, the electronic device 201 may control the display of the first object 610 and the extended first object 620 using the method described in connection with operation 705 of FIG. 7.

According to various embodiments, the electronic device 201 (e.g., the processor 220 of FIG. 2) may execute a sound mode corresponding to the first application among a plurality of sound modes based on a change of the state of the housing 101 from the normal state to the extended state while the first application is running. For example, referring to FIG. 9, the electronic device 201 may execute the sound mode (e.g., music mode) corresponding to the music application among the plurality of sound modes (e.g., movie mode, music mode, and call mode) based on a change of the state of the housing 101 from the normal state to the extended state while the music application is running According to an embodiment, the electronic device 201 may control the flexible display 260 to display a message indicating the execution of the sound mode in response to execution of the sound mode. For example, referring to FIG. 9, the electronic device 201 may display a message 910 indicating the execution of the music mode in response to the execution of the music mode.

Figure 10:
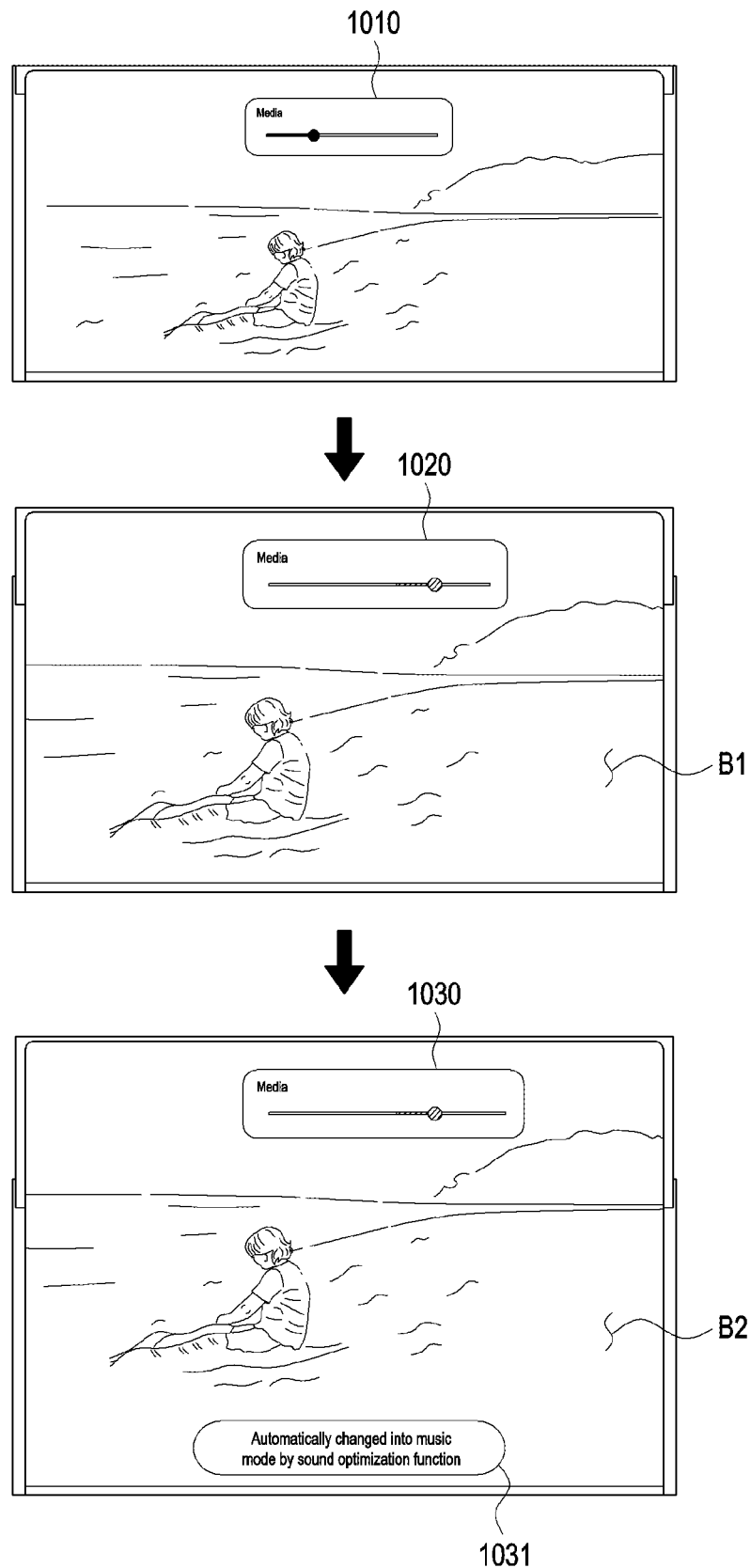
FIG. 10 is a view illustrating an example electronic device which executes a sound optimization function according to an extended state of a housing while executing a second application according to various embodiments.

FIG. 10 is a view illustrating an example in which an example electronic device (e.g., the electronic device 201 of FIG. 2) executes a sound optimization function according to the extended state of a housing (e.g., the housing 101 of FIGS. 1A to 1C) while executing a second application. In the following description, it is assumed that the sound optimization function of the electronic device 201 has been activated according to FIGS. 8A and 8B or some other sound optimization function activation process.

Referring to FIG. 10, while a second application (e.g., video application) is running in the normal state of the housing 101, the electronic device 201 (e.g., the processor 220 of FIG. 2) may set the output volume of the first sound to a first volume value and control the speaker (e.g., the sound output module 255) to output the first sound having the first volume value. According to an embodiment, the electronic device 201 may set the maximum volume of the first sound, which may be output through the speaker 255, to a first maximum volume value while the state of the housing 101 is the normal state. According to an embodiment, while the second application is running in the normal state of the housing 101, the electronic device 201 may control the speaker 255 to output the first sound having the first volume value while controlling the flexible display 260 to display the first object 1010 of the first size indicating the output state of the first sound of the first type (e.g., media type) corresponding to the second application (e.g., video application).

Referring to FIG. 10, the electronic device 201 (e.g., the processor 220 of FIG. 2) may identify the size of the first area B1 of the flexible display 260 exposed to the outside based on a first slide of the housing 101 to change the state of the housing 101 from the normal state to the first extended state (e.g., 50% extended).

Referring to FIG. 10, while the state of the housing 101 is a first extended state, the electronic device 201 (e.g., the processor 220 of FIG. 2) may set the output volume of the first sound to the second volume value higher than the first volume value based on the size of the first area and control the speaker 255 to output the first sound having the second volume value. According to an embodiment, while the state of the housing 101 is the first extended state, the electronic device 201 may set the maximum volume of the first sound to a second maximum volume value higher than the first maximum volume value based on the size of the first area. According to an embodiment, while the state of the housing 101 is the first extended state, the electronic device 201 may control the speaker 255 to output the first sound at the second volume value while controlling the flexible display 260 to display the first object 1020 extended from the first size to the second size, based on the size of the first area.

Referring to FIG. 10, the electronic device 201 (e.g., the processor 220 of FIG. 2) may identify the size of the second area B2 of the flexible display 260 exposed to the outside based on a second slide of the housing 101 to change the state of the housing 101 from the normal state to the second extended state (e.g., 100% extended).

Referring to FIG. 10, while the state of the housing 101 is the second extended state, the electronic device 201 (e.g., the processor 220 of FIG. 2) may set the output volume of the first sound to a third volume value higher than the second volume value based on the size of the second area and control the speaker 255 to output the first sound having the third volume value. According to an embodiment, while the state of the housing 101 is the second extended state, the electronic device 201 may set the maximum volume of the first sound to the third maximum volume value higher than the second maximum volume value based on the size of the second area. According to an embodiment, while the state of the housing 101 is the second extended state, the electronic device 201 may control the speaker 255 to output the first sound at the third volume value while controlling the flexible display 260 to display the first object 1030 extended from the second size to the third size, based on the size of the second area.

Referring to FIG. 10, the electronic device 201 (e.g., the processor 220 of FIG. 2) may execute a sound mode (e.g., movie mode) corresponding to the second application (e.g., video application) among the plurality of sound modes based on a change of the state of the housing 101 from the normal state to the maximum extended state (e.g., second extended state) while the first application is running According to an embodiment, the electronic device 201 may control the flexible display 260 to display a message 1031 indicating the execution of the sound mode in response to execution of the sound mode.

Figure 11:
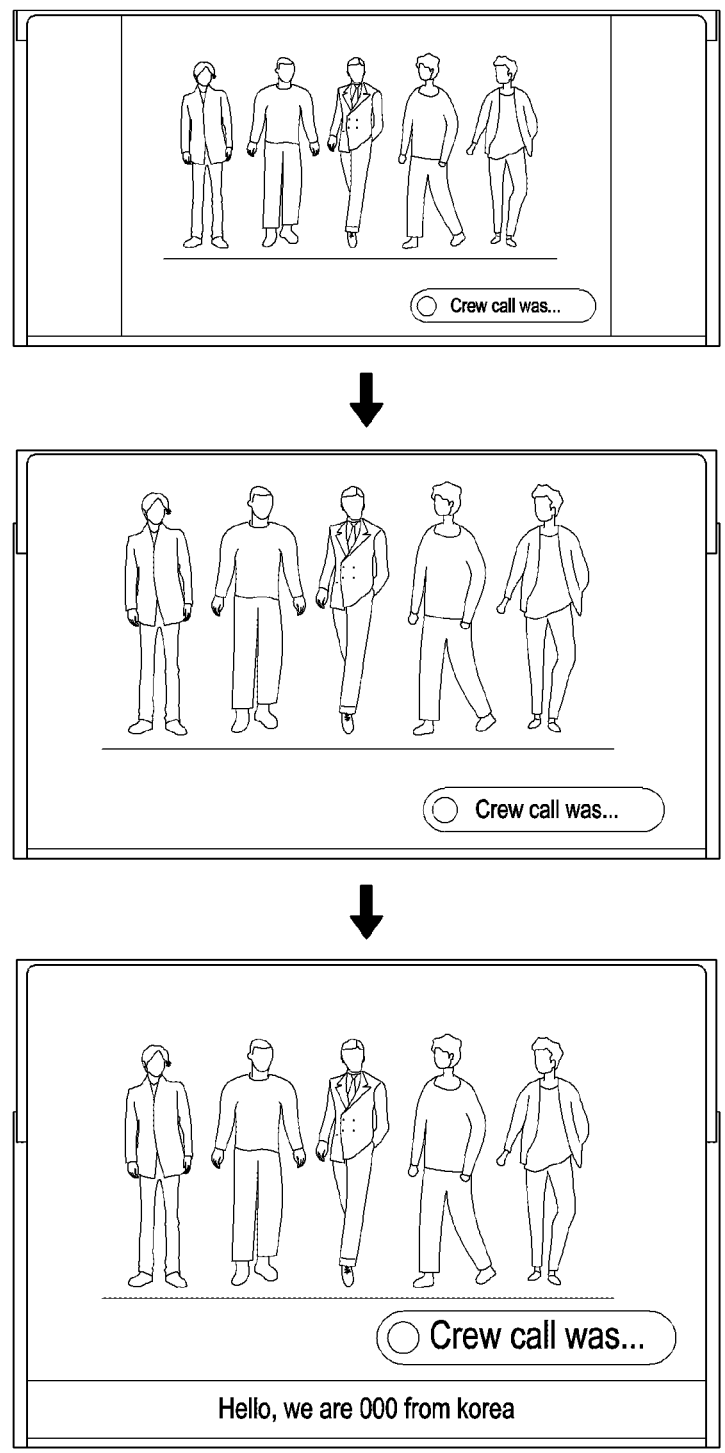
FIG. 11 is a view illustrating an example electronic device which executes a sound optimization function according to an extended state of a housing while executing a specific application according to various embodiments.
Figure 12:
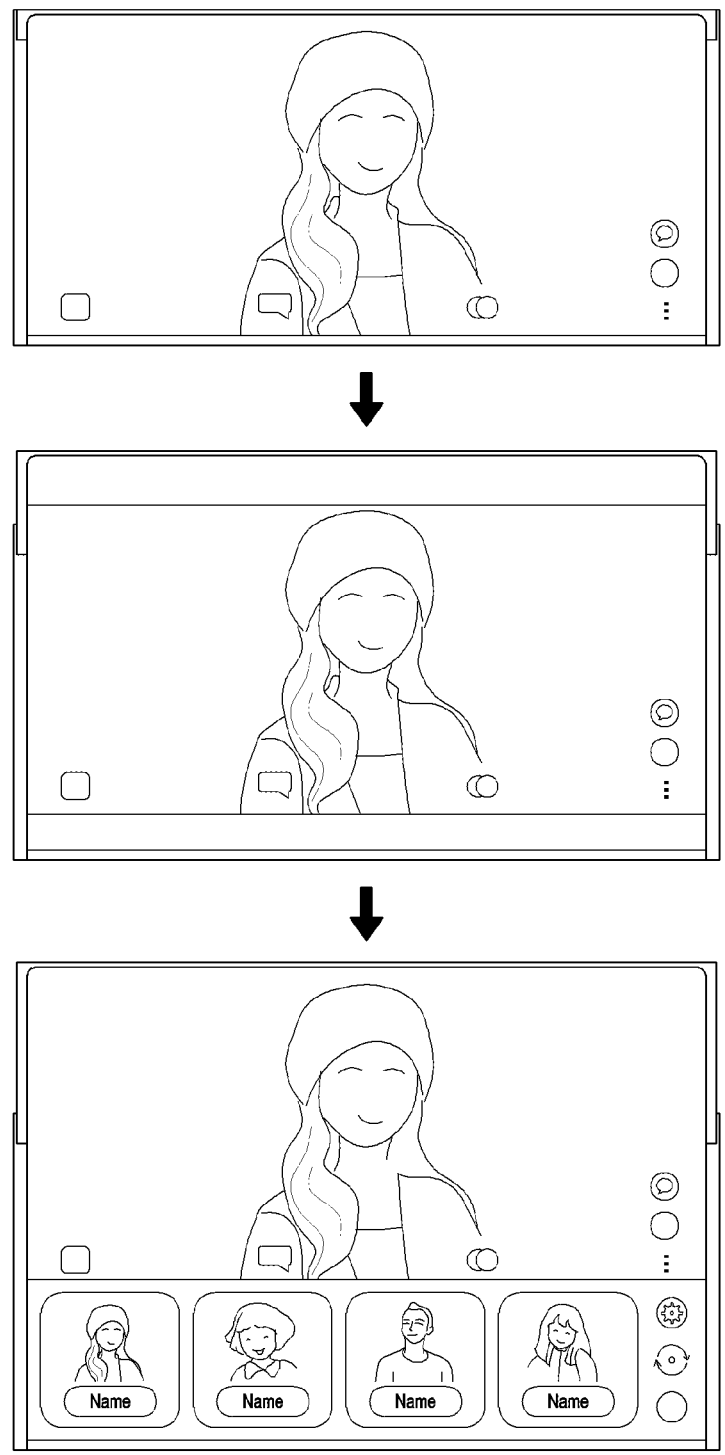
FIG. 12 is a view illustrating an example electronic device which executes a sound optimization function according to an extended state of a housing while executing a specific application according to various embodiments.
Figure 13:
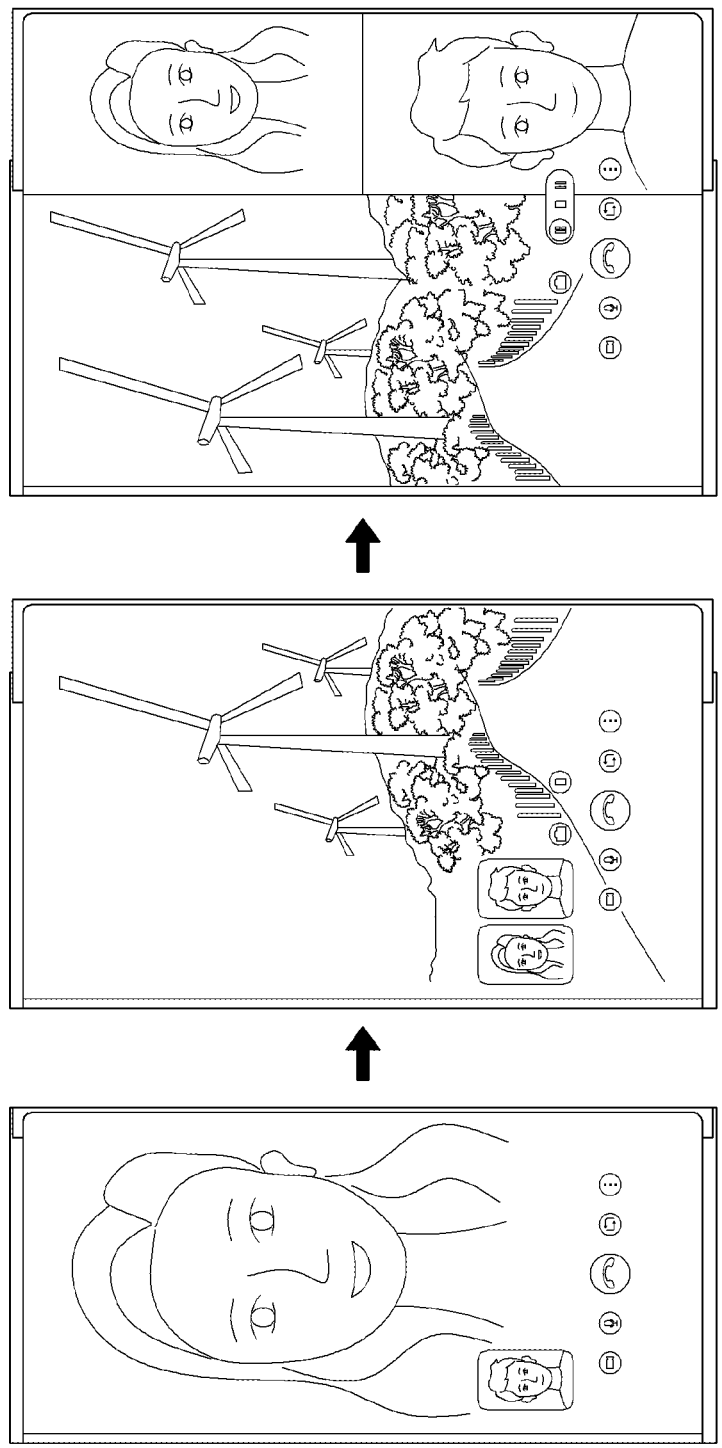
FIG. 13 is a view illustrating an example electronic device which executes a sound optimization function according to an extended state of a housing while executing a specific application according to various embodiments.
Figure 14:
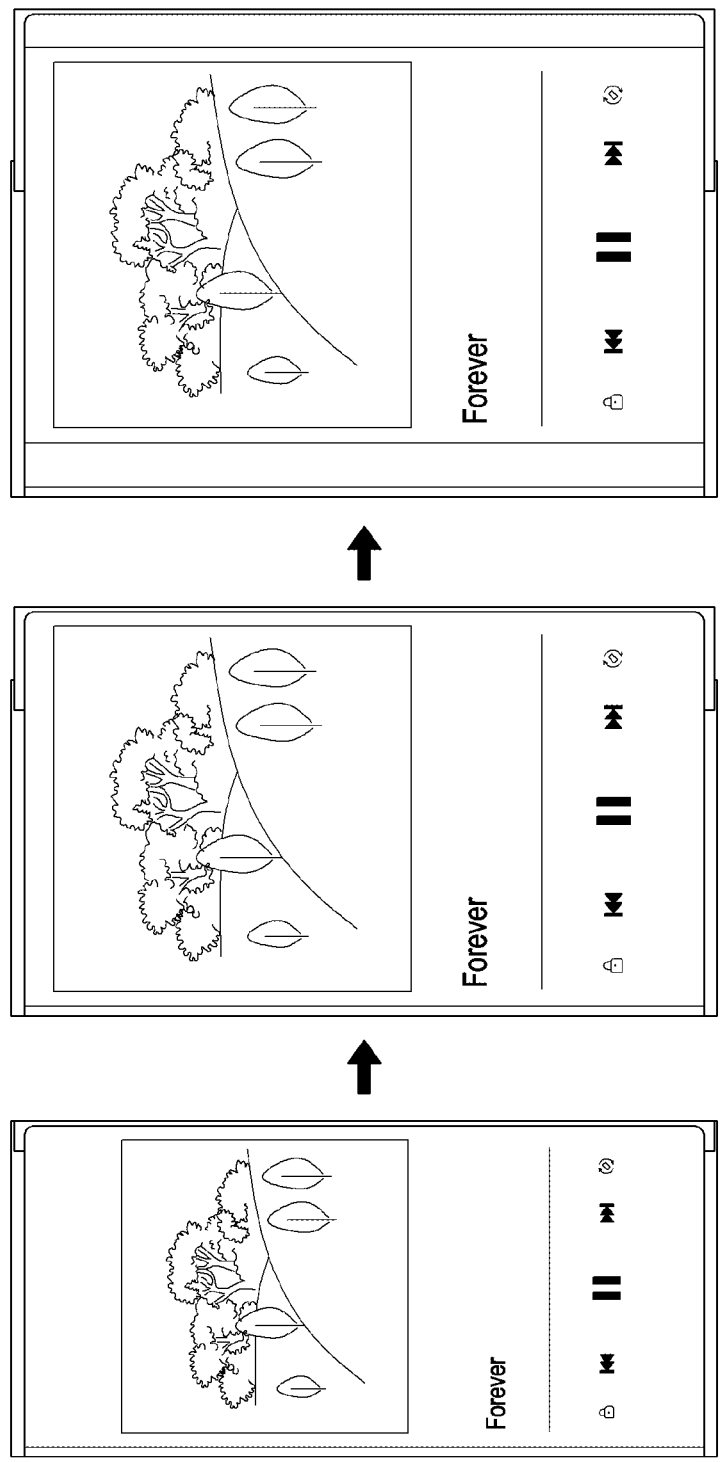
FIG. 14 is a view illustrating an example electronic device which executes a sound optimization function according to an extended state of a housing while executing a specific application according to various embodiments.

FIG. 11 is a view illustrating an example in which an example electronic device (e.g., the electronic device 201 of FIG. 2) executes a sound optimization function according to the extended state of a housing (e.g., the housing 101 of FIGS. 1A to 1C) while executing a specific application. FIG. 12 is a view illustrating an example in which an example electronic device 201 executes a sound optimization function according to an extended state of a housing 101 while executing a specific application according to various embodiments. FIG. 13 is a view illustrating an example in which an example electronic device 201 executes a sound optimization function according to an extended state of a housing 101 while executing a specific application according to various embodiments. FIG. 14 is a view illustrating an example in which an example electronic device 201 executes a sound optimization function according to an extended state of a housing 101 while executing a specific application according to various embodiments. In the following description, it is assumed that the sound optimization function of the electronic device 201 has been activated according to FIGS. 8A and 8B or some other sound optimization function activation process.

According to various embodiments, while the first application is running in the normal state of the housing 101, the electronic device 201 (e.g., the processor 220 of FIG. 2) may set the output volume of the first sound to a first volume value and control the speaker (e.g., the sound output module 255) to output the first sound having the first volume value. For example, referring to FIGS. 11 to 14, the electronic device 201 may set the output volume of the first sound to the first volume value while a first application (e.g., video, live streaming, video call, or music application) is running in the normal state of the housing 101 and control the speaker 255 to output the first sound having the first volume value. According to an embodiment, the electronic device 201 may set the maximum volume of the first sound, which may be output through the speaker 255, to a first maximum volume value while the state of the housing 101 is the normal state.

According to various embodiments, the electronic device 201 (e.g., the processor 220 of FIG. 2) may identify the size of the first area of the flexible display 260 exposed to the outside based on a first slide of the housing 101 to change the state of the housing 101 from the normal state to the first extended state.

According to various embodiments, while the state of the housing 101 is a first extended state, the electronic device 201 (e.g., the processor 220 of FIG. 2) may set the output volume of the first sound to the second volume value higher than the first volume value based on the size of the first area and control the speaker 255 to output the first sound having the second volume value. According to an embodiment, while the state of the housing 101 is the first extended state, the electronic device 201 may set the maximum volume of the first sound to a second maximum volume value higher than the first maximum volume value based on the size of the first area. According to an embodiment, the electronic device 201 may execute a sound mode corresponding to the first application among a plurality of sound modes based on a change of the state of the housing 101 from the normal state to the extended state while the first application is running. For example, referring to FIGS. 13 and 14, the electronic device 201 may execute the video call mode corresponding to the video call application or the music mode corresponding to the music application based on a change of the state of the housing 101 from the normal state to the first extended state (e.g., 50% extended) while the video call application or music application is running According to an embodiment, when an earphone is wiredly and/or wirelessly connected to the electronic device 201 while the music application is running in the first extended state of the housing 101, the electronic device 201 may deactivate the sound optimization function, reset the output volume of the first sound from the normal state to the first volume value, and control the speaker 255 to output the first sound having the first volume value while in the extended state.

According to various embodiments, the electronic device 201 (e.g., the processor 220 of FIG. 2) may identify the size of the second area of the flexible display 260 exposed to the outside based on a second slide of the housing 101 to change the state of the housing 101 from the first extended state to the second extended state.

According to various embodiments, while the state of the housing 101 is the second extended state, the electronic device 201 (e.g., the processor 220 of FIG. 2) may set the output volume of the first sound to the third volume value higher than the second volume value based on the size of the second area and control the speaker 255 to output the first sound having the third volume value. According to an embodiment, while the state of the housing 101 is the second extended state, the electronic device 201 may set the maximum volume of the first sound to the third maximum volume value higher than the second maximum volume value based on the size of the second area. According to an embodiment, the electronic device 201 may execute a sound mode corresponding to the first application among a plurality of sound modes based on a change of the state of the housing 101 from the first extended state to the second extended state while the first application is running. For example, referring to FIGS. 11 and 12, the electronic device 201 may execute the movie mode corresponding to the live streaming application or the video application based on a change of the state of the housing 101 from the first extended state to the maximum extended state (e.g., 100% extended) while the video application or the live streaming application is running According to an embodiment, the electronic device 201 may relatively increase only the sound of the electronic device corresponding to the user who is currently speaking among the plurality of electronic devices in communication connection with the electronic device 201 based on a change of the state of the housing 101 from the first extended state to the maximum extended state (e.g., 100% extended) while the live streaming application is running.

Figure 15:
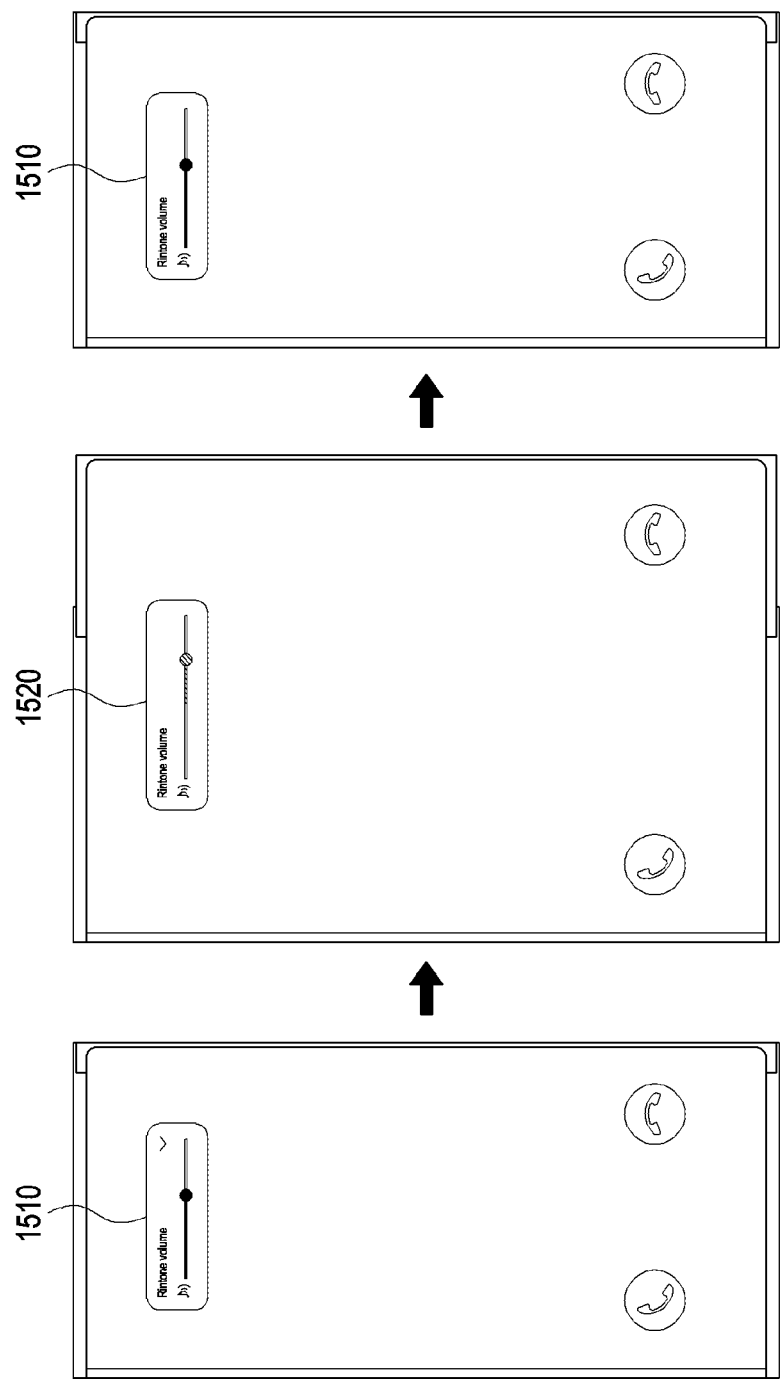
FIG. 15 is a view illustrating an example electronic device which executes a sound optimization function according to an extended state of a housing while receiving a call according to various embodiments.

FIG. 15 is a view illustrating an example in which an example electronic device (e.g., the electronic device 201 of FIG. 2) executes a sound optimization function according to the extended state of a housing (e.g., the housing 101 of FIGS. 1A to 1C) while receiving a call. In the following description, it is assumed that the sound optimization function of the electronic device 201 has been activated according to FIGS. 8A and 8B or some other sound optimization function activation process.

According to various embodiments, while the state of the housing 101 is the normal state, the electronic device 201 (e.g., the processor 220 of FIG. 2) may set the output volume of the first sound of the first type (e.g., ringtone type) to a first volume value and control the speaker (e.g., the sound output module 255) to output the first sound having the first volume value. For example, referring to FIG. 15, the electronic device 201 may set the output volume of the first sound of the ringtone type to the first volume value while a call is being received in the normal state of the housing 101 and control the speaker 255 to output the first sound having the first volume value. According to an embodiment, the electronic device 201 may set the maximum volume of the first sound, which may be output through the speaker 255, to a first maximum volume value while the state of the housing 101 is the normal state. According to an embodiment, while receiving the call in the normal state of the housing 101, the electronic device 201 may control the flexible display 260 to display a first object of a first size indicating the output state of the first sound of the ringtone type. For example, referring to FIG. 15, while receiving the call in the normal state of the housing 101, the electronic device 201 may control the speaker 255 to output the first sound having the first volume value while displaying the first object 1510 of the first size indicating the output state of the first sound of the ringtone type.

According to various embodiments, the electronic device 201 (e.g., the processor 220 of FIG. 2) may identify the size of the first area of the flexible display 260 exposed to the outside based on a first slide of the housing 101 to change the state of the housing 101 from the normal state to the extended state while receiving the call.

According to various embodiments, when the state of the housing 101 is changed from the normal state to the extended state while receiving the call, the electronic device 201 (e.g., the processor 220 of FIG. 2) may set the output volume of the first sound to the second volume value higher than the first volume value based on the size of the first area and control the speaker 255 to output the ringtone-type first sound having the second volume value. According to an embodiment, when the state of the housing 101 is changed from the normal state to the extended state while receiving the call, the electronic device 201 may set the maximum volume of the first sound to the second maximum volume value higher than the first maximum volume value based on the size of the first area. According to an embodiment, while the state of the housing 101 is changed from the normal state to the extended state while receiving the call, the electronic device 201 may control the speaker 255 to output the first sound at the second volume value while controlling the flexible display 260 to display the first object extended from the first size to the second size based on the size of the first area. For example, referring to FIG. 15, the electronic device 201 may control the speaker 255 to output the first sound having the second volume value corresponding to the size of the first area while displaying the first object 1520 extended to the second size corresponding to the size of the first area, based on a change of the state of the housing 101 from the normal state to the maximum extended state (e.g., 100% extended) while receiving the call.

According to various embodiments, the electronic device 201 (e.g., the processor 220 of FIG. 2) may set the output volume of the first sound to the first volume value lower than the second volume value and control the speaker 255 to output the first sound having the first volume value, based on the second slide of the housing 101 to change the state of the housing from the extended state to the normal state while receiving the call. According to an embodiment, when the state of the housing 101 is changed from the extended state to the normal state while receiving the call, the electronic device 201 may reset the maximum volume of the first sound to the first maximum volume value lower than the second maximum volume value. According to an embodiment, when the state of the housing 101 is changed from the extended state to the normal state while receiving the call, the electronic device 201 may control the speaker 255 to output the first sound at the first volume value while controlling the flexible display 260 to display the first object shrunken from the second size to the first size. For example, referring to FIG. 15, the electronic device 201 may control the speaker 255 to output the first sound having the first volume value while displaying the first object 1510 reduced to the first size based on a change of the state of the housing 101 from the maximum extended state to the normal state while receiving the call.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 201). For example, a processor (e.g., the processor 120) of the machine (e.g., the electronic device 201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium, which refers, for example, to a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, an electronic device (e.g., the electronic device 201 of FIG. 2) may comprise a housing, a flexible display (e.g., the display module 260 of FIG. 2) wherein at least a portion of the flexible display which is positioned in the housing is configured to be exposed to an outside of the housing by sliding for the housing, a speaker (e.g., the sound output module 255 of FIG. 2), and a processor (e.g., the processor 220 of FIG. 2) operatively connected with the speaker and the flexible display. The processor may be configured to control the speaker to output a first sound at a first volume value while a state of the housing is a normal state, identify a size of a first area of the flexible display exposed to the outside, based on a first slide of the housing to change the state of the housing to an extended state, and control the speaker to output the first sound at a second volume value higher than the first volume value based on a size of the first area while the state of the housing is the extended state.

According to various embodiments, a table defining an extended size of a first object per size of the first area is stored in a memory and the processor may be configured to extend and display the first object from a first size to a second size according to the extended size of the first object corresponding to the size of the first area identified from the table.

According to various embodiments, the processor may be configured to identify a ratio of extension from an area exposed to the outside in the normal state to the first area exposed to the outside in the extended state, and extend a size of a first object from a first size to a second size by the extended ratio and display the first object.

According to various embodiments, the processor may be configured to set a maximum volume of the first sound outputable from the speaker to a first maximum volume value while the state of the housing is the normal state.

According to various embodiments, the processor may be configured to set the maximum volume of the first sound to a second maximum volume value higher than the first maximum volume value based on a size of the first area while the state of the housing is the extended state.

According to various embodiments, the processor may be configured to control the speaker to output the first sound at the first volume value while controlling the flexible display to display a first object of a first size indicating an output state of the first sound while the state of the housing is the normal state.

According to various embodiments, the processor may be configured to control the speaker to output the first sound at the second volume value while controlling the flexible display to display the first object extended from the first size to a second size based on the size of the first area while the state of the housing is the extended state.

According to various embodiments, the processor may be configured to extend a length of a volume status bar included in the first object and change a position of a volume indicator included in the first object using a ratio of extension from the normal state to the extended state while the state of the housing is the extended state.

According to various embodiments, the processor may be configured to execute a sound mode corresponding to a first application among a plurality of sound modes based on a change of the state of the housing from the normal state to the extended state while the first application is running.

According to various embodiments, the processor may be configured to set an output volume of the first sound of a first type to a first volume value while the electronic device is receiving a call in the normal state of the housing, set the output volume of the first sound to a second volume value higher than the first volume value based on the size of the first area when the state of the housing is changed from the normal state to the extended state while receiving the call, and control the speaker to output the first sound of the first type having the second volume value.

According to various embodiments, a method for operating an electronic device including a flexible display may comprise controlling a speaker of the electronic device to output a first sound at a first volume value while a state of the housing is a normal state, identifying a size of a first area of the flexible display exposed to the outside, based on a first slide of the housing to change the state of the housing to an extended state, and controlling the speaker to output the first sound at a second volume value higher than the first volume value based on a size of the first area while the state of the housing is the extended state.

According to various embodiments, the method may further comprise storing a table defining an extended size of a first object per size of the first area in a memory, and extending and displaying the first object from a first size to a second size according to the extended size of the first object corresponding to the size of the first area identified from the table.

According to various embodiments, the method may further comprise identifying a ratio of extension from an area exposed to the outside in the normal state to the first area exposed to the outside in the extended state and extending a size of a first object from a first size to a second size by the extended ratio and displaying the first object.

According to various embodiments, the method may further comprise setting a maximum volume of the first sound outputable from the speaker to a first maximum volume value while the state of the housing is the normal state.

According to various embodiments, the method may further comprise setting the maximum volume of the first sound to a second maximum volume value higher than the first maximum volume value based on a size of the first area while the state of the housing is the extended state.

According to various embodiments, the method may further comprise controlling the speaker to output the first sound at the first volume value while controlling the flexible display to display a first object of a first size indicating an output state of the first sound while the state of the housing is the normal state.

According to various embodiments, the method may further comprise controlling the speaker to output the first sound at the second volume value while controlling the flexible display to display the first object extended from the first size to a second size based on the size of the first area while the state of the housing is the extended state.

According to various embodiments, the method may further comprise extending a length of a volume status bar included in the first object and changing a position of a volume indicator included in the first object using a ratio of extension from the normal state to the extended state while the state of the housing is the extended state.

According to various embodiments, the method may further comprise executing a sound mode corresponding to a first application among a plurality of sound modes based on a change of the state of the housing from the normal state to the extended state while the first application is running.

According to various embodiments, an electronic device may comprise a housing, a flexible display, wherein at least a portion of the flexible display which is positioned in the housing is configured to be exposed to an outside of the housing as the housing slides, a speaker, and a processor operatively connected with the speaker and the flexible display. The processor may be configured to: control the speaker to output a first sound at a first volume value while controlling the flexible display to display a first object of a first size indicating an output state of the first sound while a state of the housing is a normal state, identify a size of a first area of the flexible display exposed to the outside, based on a first slide of the housing to change the state of the housing from the normal state to an extended state, and control the speaker to output the first sound at a second volume value higher than the first volume value while controlling the flexible display to display the first object extended from the first size to a second size based on the size of the first area while the state of the housing is the extended state.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a housing including a first housing part and a second housing part, wherein the second housing part is configured to movably engage with the first housing part between a retracted position and an extended position,
   a flexible display coupled to the second housing part such that a size of an area of the flexible display that is visible from a front side of the housing changes as the second housing part is moved between the retracted position and the extended position,
   a speaker,
   at least one processor comprising processing circuitry, and
   memory storing executable instructions,
   wherein the instructions, when executed by the at least one processor, cause the electronic device to:
      based on the second housing part being at the retracted position, set a first volume range within which a volume level of the speaker is adjustable;
      control the speaker to output a first sound at a first volume level within the first volume range; and
      based on the second housing part being moved from the retracted position to the extended position:
         increase a volume range of the speaker from the first volume range to a second volume range greater than the first volume range, and
         control the speaker to output the first sound at a second volume level within the second volume range.

2. The electronic device of claim 1,
   wherein the memory is configured to store a table defining a size of a first volume level indicating object for each of a plurality of sizes of exposed areas of the flexible display, and
   wherein the instructions, when executed by the at least one processor, cause the electronic device to identify a size of the exposed area of the flexible display while the second housing part is at the extended position and, based on the stored table, change a size of at least one dimension of the first volume level indicating object. according to the identified size.

3. The electronic device of claim 1, wherein the instructions, when executed by the at least one processor, cause the electronic device to:
   identify a ratio of a first size of an exposed area of the flexible display when the second housing part is at the retracted position to a second size of the exposed area of the flexible display when the second housing part is at the extended position, and determine a size of at least one dimension of a first volume level indicating object according to the ratio and display the first volume level indicating object.

4. The electronic device of claim 1, wherein the instructions, when executed by the at least one processor, cause the electronic device to control the speaker to output the first sound at the first volume level while controlling the flexible display to display a volume level indicating object of a first size indicating a volume level of the first sound while the second housing part is at the retracted position.

5. The electronic device of claim 4, wherein the instructions, when executed by the at least one processor, cause the electronic device to control the speaker to output the first sound at the second volume level while controlling the flexible display to display the volume level indicating object extended in at least one dimension from the first size to a second size based on a size of an exposed area of the flexible display while the second housing part is at the extended position.

6. The electronic device of claim 4, the instructions, when executed by the at least one processor, cause the electronic device to extend a length of a volume status bar included in the volume level indicating object and change a position of a volume indicator included in the volume level indicating object based on the size of an exposed area of the flexible display while the second housing part is at the extended position.

7. The electronic device of claim 1, wherein the instructions, when executed by the at least one processor, cause the electronic device to execute a sound mode corresponding to a first application among a plurality of sound modes based on detecting that the second housing part is moved from the retracted position to the extended position while the first application is running.

8. The electronic device of claim 1, wherein the instructions, when executed by the at least one processor, cause the electronic device to:
set an output volume level of the first sound of a first type to a third volume level while the electronic device is receiving a call when the second housing part is at the retracted position,
set the output volume level of the first sound to a fourth volume level higher than the third volume level based on a size of an exposed area of the flexible display when the second housing part is at the extended position while receiving the call, and
control the speaker to output the first sound of the first type having the second volume level.

9. The electronic device of claim 1, wherein an acoustic structure of the speaker changes based on the second housing part being moved from the retracted position to the extended position, and
wherein the first sound at the second volume level within the second volume range is outputted through the changed acoustic structure of the speaker.

10. The electronic device of claim 9, wherein the change in the acoustic structure of the speaker includes an increase in a number of speaker holes exposed to outside of the electronic device.

11. A method for operating an electronic device including a housing including a first housing part and a second housing part configured to movably engage with the first housing part between a retracted position and an extended position, a flexible display-coupled to the second housing part such that a size of an area of the flexible display that is visible from a front side of the housing changes as the second housing part is moved between the retracted position and the extended position, and a speaker, the method comprising:
based on the second housing part being at the retracted position, setting a first volume range within which a volume level of the speaker is adjustable;
controlling the speaker to output a first sound at a first volume level within the first volume range; and
based on the second housing part being moved from the retracted position to the extended position:
increasing a volume range of the speaker from the first volume range to a second volume range greater than the first volume range, and
controlling the speaker to output the first sound at a second volume level within the second volume range.

12. The method of claim 11, further comprising:
storing a table defining a size of a first volume level indicating object for each of a plurality of sizes of exposed areas of the flexible display, and
identifying a size of the exposed area of the flexible display while the second housing part is at the extended position and, based on the stored table, changing a size of at least one dimension of the first volume level indicating object according to the identified size.

13. The method of claim 11, further comprising:
identifying a ratio of a first size of an exposed area of the flexible display when the second housing part is at the retracted position to a second size of the exposed area of the flexible display when the second housing part is at the extended position, and
determining a size of at least one dimension of a first volume level indicating object according to the ratio and displaying the first volume level indicating object.

14. The method of claim 11, further comprising controlling the speaker to output the first sound at the first volume level while controlling the flexible display to display a volume level indicating object of a first size indicating a volume level of the first sound while the second housing part is at the retracted position.

15. The method of claim 14, further comprising controlling the speaker to output the first sound at the second volume level while controlling the flexible display to display the volume level indicating object extended in at least one dimension from the first size to a second size based on a size of an exposed area of the flexible display while the second housing part is at the extended position.

16. The method of claim 14, further comprising extending a length of a volume status bar included in the volume level indicating object and changing a position of a volume indicator included in the volume level indicating object while the second housing part is at the extended position.

17. The method of claim 11, further comprising executing a sound mode corresponding to a first application among a plurality of sound modes based on detecting that the second housing part is moved from the retracted position to the extended position while the first application is running.

18. A non-transitory storage medium storing instructions that, when executed by at least one processor of an electronic device, cause the electronic device to perform a plurality of operations, the electronic device including a housing including a first housing part and a second housing part configured to movably engage with the first housing part between a retracted position and extended positions, a flexible display coupled to the first housing part and the second housing part such that a size of an area of the flexible display that is visible from a front side of the housing changes as the second housing part is moved between the retracted position and the extended positions coupled to the first housing part and the second housing part such that a size of an area of the flexible display that is visible from a front side of the housing changes as the second housing part is moved between the retracted position and the extended positions, and a speaker, the plurality of operations comprising:

based on the second housing part being at the retracted position, setting a first volume range within which a volume level of the speaker is adjustable;

controlling the speaker to output a first sound at a first volume level within the first volume range; and based on the second housing part being moved from the retracted position to the extended position:

increasing a volume range of the speaker from the first volume range to a second volume range greater than the first volume range, and controlling the speaker to output the first sound at a second volume level within the second volume range.

\* \* \* \* \*